(12) United States Patent
Chung et al.

(10) Patent No.: US 9,037,294 B2
(45) Date of Patent: May 19, 2015

(54) ROBOT CLEANER AND CONTROL METHOD THEREOF

(75) Inventors: Woo Ram Chung, Seoul (KR); Jae Man Joo, Suwon-si (KR); Dong Won Kim, Hwaseong-si (KR); Jun Hwa Lee, Suwon-si (KR); Jun Pyo Hong, Suwon-si (KR); Jae Young Jung, Suwon-si (KR); Kyung Hwan Yoo, Incheon-si (KR); Hwi Chan Jang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 323 days.

(21) Appl. No.: 12/801,483

(22) Filed: Jun. 10, 2010

(65) Prior Publication Data

US 2010/0313364 A1    Dec. 16, 2010

Related U.S. Application Data

(60) Provisional application No. 61/186,433, filed on Jun. 12, 2009.

(30) Foreign Application Priority Data

Sep. 1, 2009  (KR) .................. 10-2009-0082186
Mar. 3, 2010  (KR) .................. 10-2010-0019004

(51) Int. Cl.
*G05D 1/02*     (2006.01)
*G06F 19/00*    (2011.01)
(Continued)

(52) U.S. Cl.
CPC ...... *G05D 1/0219* (2013.01); *G05D 2201/0203* (2013.01)

(58) Field of Classification Search
USPC ................................................. 700/245, 253
See application file for complete search history.

(56) References Cited

U.S. PATENT DOCUMENTS 3,897,150 A * 7/1975 Bridges et al. ............... 356/5.04
4,674,048 A * 6/1987 Okumura ....................... 701/25
4,795,308 A * 1/1989 Fischer et al. ................ 415/119

(Continued)

FOREIGN PATENT DOCUMENTS

CN    101278820    10/2008
JP    2006-26028    2/2006

(Continued)

OTHER PUBLICATIONS

Chinese Office Action dated Nov. 12, 2013 from Chinese Patent Application No. 201010202812.6, 14 pages.

(Continued)

*Primary Examiner* — John R Olszewski
*Assistant Examiner* — Jean-Paul Cass
(74) *Attorney, Agent, or Firm* — Staas & Halsey LLP

(57) ABSTRACT

Disclosed herein are a robot cleaner having an improved travel pattern and a control method thereof. The robot cleaner performs cleaning using zigzag travel as a basic cleaning traveling manner, and then performs cleaning using random travel as a finishing cleaning traveling manner so as to clean areas skipped during the zigzag travel. The robot cleaner performs the zigzag travel while maintaining a designated interval with a travel route proceeding to a wall regardless of a direction proceeding to the wall, and employs an improved zigzag travel method to maintain a zigzag travel pattern, if the robot cleaner senses an obstacle during the zigzag travel.

23 Claims, 18 Drawing Sheets

(51) Int. Cl.
*A47L 9/00* (2006.01)
*B08B 7/00* (2006.01)

(56) References Cited

U.S. PATENT DOCUMENTS

| | | | | |
|---|---|---|---|---|
| 4,962,453 | A * | 10/1990 | Pong et al. | 701/23 |
| 4,979,128 | A * | 12/1990 | Seki et al. | 700/264 |
| 5,086,535 | A * | 2/1992 | Grossmeyer et al. | 15/319 |
| 5,109,566 | A * | 5/1992 | Kobayashi et al. | 15/319 |
| 5,175,616 | A * | 12/1992 | Milgram et al. | 348/47 |
| 5,276,618 | A * | 1/1994 | Everett, Jr. | 701/25 |
| 5,284,522 | A * | 2/1994 | Kobayashi et al. | 134/18 |
| 5,417,042 | A * | 5/1995 | Walch et al. | 56/6 |
| 5,423,165 | A * | 6/1995 | Walch et al. | 56/6 |
| 5,621,291 | A * | 4/1997 | Lee | 318/568.16 |
| 5,867,800 | A * | 2/1999 | Leif | 701/23 |
| 5,935,179 | A * | 8/1999 | Kleiner et al. | 701/23 |
| 5,942,869 | A * | 8/1999 | Katou et al. | 318/568.12 |
| 6,076,025 | A * | 6/2000 | Ueno et al. | 701/23 |
| 6,240,342 | B1 * | 5/2001 | Fiegert et al. | 701/25 |
| 6,809,490 | B2 * | 10/2004 | Jones et al. | 318/568.12 |
| 7,288,912 | B2 * | 10/2007 | Landry et al. | 318/580 |
| 7,332,890 | B2 * | 2/2008 | Cohen et al. | 320/109 |
| 7,515,991 | B2 * | 4/2009 | Egawa et al. | 700/245 |
| 8,387,193 | B2 * | 3/2013 | Ziegler et al. | 15/50.1 |
| 2003/0025472 | A1 | 2/2003 | Jones et al. | |
| 2005/0171644 | A1 * | 8/2005 | Tani | 700/253 |
| 2006/0190135 | A1 | 8/2006 | Lee et al. | |
| 2008/0249661 | A1 * | 10/2008 | Hong et al. | 700/252 |
| 2009/0157227 | A1 * | 6/2009 | Park et al. | 700/258 |
| 2011/0098853 | A1 * | 4/2011 | Park et al. | 700/245 |
| 2011/0118928 | A1 * | 5/2011 | Yoo et al. | 701/26 |

FOREIGN PATENT DOCUMENTS

| | | |
|---|---|---|
| JP | 2006-323618 | 11/2006 |
| KR | 10-2005-0061775 | 6/2005 |
| KR | 10-2006-0081131 | 7/2006 |
| KR | 10-2006-0109574 | 10/2006 |
| KR | 10-2007-0096689 | 10/2007 |
| KR | 10-2008-0090925 | 10/2008 |
| WO | 2009/057918 | 5/2009 |

OTHER PUBLICATIONS

Korean Office Action dated Aug. 14, 2014 in corresponding Korean Patent Application No. 10-2010-0019004, 6 pages.

Extended European Search Report dated Oct. 28, 2014 in corresponding European Patent Application No. 10165458.0.

\* cited by examiner

ROBOT CLEANER AND CONTROL METHOD THEREOF

CROSS-REFERENCE TO RELATED APPLICATIONS

This application claims the priority benefit of U.S. Patent Application Ser. No. 61/186,433, filed on Jun. 12, 2009 in the U.S. Patent and Trademark Office, Korean Patent Application No. 2009-0082186, filed on Sep. 1, 2009 in the Korean Intellectual Property Office, and Korean Patent Application No. 2010-19004, filed on Mar. 3, 2010, in the Korean Intellectual Property Office, the disclosures of which are incorporated herein by reference.

BACKGROUND

1. Field

Embodiments relate to a robot cleaner which employs an improved travel pattern, and a control method thereof.

2. Description of the Related Art

In general, robot cleaners are apparatuses which inhale foreign substances, such as dust, from a floor, while autonomously traveling an area to be cleaned without user manipulation, so as to perform a cleaning operation.

The robot cleaners repeat the cleaning operation while traveling an area to be cleaned in a predetermined travel pattern. There are representative travel patterns, i.e., a zigzag travel pattern and a random travel pattern. In the zigzag travel pattern, when a robot cleaner encounters an obstacle (for example, a wall) during rectilinear travel, the robot cleaner is rotated by an angle of 90 degrees. On the other hand, in the random travel pattern, when a robot cleaner encounters an obstacle (for example, a wall) during rectilinear travel, the robot is rotated in a random direction and then again travels rectilinearly.

SUMMARY

In an aspect of one or more embodiments, there is provided a robot cleaner which employs a zigzag travel pattern enabling the robot cleaner to maintain zigzag travel while maintaining a designated interval with a travel route proceeding to a wall regardless of a collision angle of the robot cleaner with the wall, and a control method thereof.

In an aspect of one or more embodiments, there is provided a robot cleaner which employs an improved zigzag travel pattern enabling the robot cleaner to maintain the zigzag travel pattern, if the robot cleaner senses an obstacle during zigzag travel, and a control method thereof.

In an aspect of one or more embodiments, there is provided a robot cleaner which performs a cleaning operation using zigzag travel as a basic cleaning traveling manner and random travel as a finishing cleaning traveling manner so as to clean areas skipped during the zigzag travel, and a control method thereof.

In an aspect of one or more embodiments, there is provided a control method of a robot cleaner includes performing zigzag travel including first travel enabling the robot cleaner to proceed from one point in an area, to be cleaned, toward a designated wall, and second travel enabling the robot cleaner to be more distant from the designated wall after the first travel, the first travel and the second travel being repeated, wherein a route of the first travel and a route of the second travel respectively maintain designated intervals with each other.

An angle between the route of the first travel and the wall may be in the range of an angle of 0 to 180 degrees. The maintenance of the designated intervals between the route of the first travel and the route of the second travel may include the route of the second travel maintains a first designated interval with the route of the first travel, and the route of the first travel maintains a second designated interval with the route of the second travel.

The second travel may be performed until a distance of the route of the second travel reaches a third designated distance. The zigzag travel may further include third travel enabling the robot cleaner to change a direction after the second travel and then to travel until the robot cleaner is separated from the route of the second travel by the second designated interval.

The zigzag travel may be performed by performing obstacle following travel, if the robot cleaner encounters an obstacle during the zigzag travel, obtaining a separation distance of the robot cleaner with a route of the zigzag travel, and enabling the robot cleaner to travel in a direction parallel with the route of the zigzag travel prior to the obstacle following travel, if the separation distance reaches zero.

The zigzag travel may be performed by performing obstacle following travel, if the robot cleaner encounters an obstacle during the first travel, obtaining a separation distance of the robot cleaner from the route of the first travel, and performing the second travel, if the separation distance reaches the first designated interval.

The performing obstacle traveling may denote traveling alongside an obstacle.

The zigzag travel may be performed by performing obstacle following travel, if the robot cleaner encounters an obstacle during the second travel, obtaining a separation distance of the robot cleaner from the route of the second travel, and performing the first travel, if the separation distance reaches the second designated interval.

The zigzag travel may be performed by performing obstacle following travel, if the robot cleaner encounters an obstacle during the second travel, and performing the third travel, if the sum total of a distance of the second travel and a travel distance of the robot cleaner in a direction of the second travel during the obstacle following travel reaches the third designated distance.

The zigzag travel may be performed by performing obstacle following travel, if the robot cleaner encounters an obstacle during the third travel, and performing the first travel, if the sum total of a distance of the third travel and a travel distance of the robot cleaner in a direction of the third travel during the obstacle following travel reaches the second designated interval.

The zigzag travel may be performed by performing obstacle following travel, if the robot cleaner encounters an obstacle during the second travel, and performing the third travel at the current position of the robot cleaner, if a forward direction of the robot cleaner is within a designated angle range based on a direction of the second travel.

The zigzag travel may be performed by performing obstacle following travel, if the robot cleaner encounters an obstacle during the third travel, and performing the third travel at the current position of the robot cleaner, if a forward direction of the robot cleaner is within a designated angle range based on a direction of the third travel.

The zigzag travel may be performed by performing obstacle following travel, if the robot cleaner encounters an obstacle during the first travel, and performing the first travel at the current position of the robot cleaner, if a forward direction of the robot cleaner is within a designated angle range based on a direction of the first travel.

The zigzag travel may be performed by performing obstacle following travel, if the robot cleaner encounters an obstacle during the second travel or the third travel, and changing a direction of the robot cleaner and then performing the obstacle following travel in the changed direction, if a forward direction of the robot cleaner is within a designated angle range based on a direction of the second travel and the third travel or if a distance of the obstacle following travel is more than a fourth designated distance.

The second travel may be performed, if the robot cleaner is separated from one point, between a point where the robot cleaner starts the obstacle following travel and a point where the robot cleaner starts the obstacle following travel in the changed direction, by the first designated interval.

The zigzag travel may be performed by performing obstacle following travel, if the robot cleaner encounters an obstacle during the second travel or the third travel, obtaining a separation distance of the robot cleaner from the route of the second travel, and changing a direction of the robot cleaner and then performing the obstacle following travel in the changed direction, if the separation distance reaches zero.

The second travel may be performed, if the robot cleaner is separated from one point, between a point where the robot cleaner starts the obstacle following travel and a point where the robot cleaner starts the obstacle following travel in the changed direction, by the first designated interval.

The zigzag travel may be performed by performing obstacle following travel, if the robot cleaner encounters an obstacle during the zigzag travel, judging whether or not the robot cleaner enters an area opposite to a direction of the zigzag travel, based on the route of the zigzag travel prior to the obstacle following travel, during the obstacle following travel, and changing the direction of the zigzag travel to the opposite direction and then performing the zigzag travel in the opposite direction, if the robot cleaner is separated from the route of the zigzag travel prior to the obstacle following travel by a designated interval, or a forward direction of the robot cleaner reaches a designated direction.

It may be judged that the robot cleaner enters the area opposite to the direction of the zigzag travel, based on the route of the zigzag travel prior to the obstacle following travel, during the obstacle following travel, if the separation distance of the robot cleaner from a route of the zigzag travel reaches zero and the forward direction of the robot cleaner is within the range in a designated angle based on the route of the zigzag travel prior to the obstacle following travel.

The control method may further include judging that it is time to finish the zigzag travel, if the number of changes of the direction of the zigzag travel is more than a designated number or if a time of the zigzag travel is more than a designated time, and performing random travel as a finishing cleaning travel manner to perform cleaning.

The control method may further include judging that it is time to finish the random travel, if a designated time determined in proportion to the mean rectilinear travel distance of the random travel elapses.

In an aspect of one or more embodiments, there is provided a robot cleaner includes a main body which forms an external appearance of the robot cleaner, driving wheels installed on the main body, and a control unit to control the driving wheels to enable the main body to move rectilinearly or be rotated, wherein the control unit performs zigzag travel by repeating first travel to enable the robot cleaner to proceed from one point in an area, to be cleaned, toward a designated wall, and repeating second travel to enable the robot cleaner to be more distant from the designated wall after the first travel, and a route of the first travel and a route of the second travel respectively maintain designated intervals with each other.

The control unit may further perform random travel as a finishing cleaning travel manner to perform cleaning.

According to another aspect of one or more embodiments, there is provided at least one computer readable medium storing computer readable instructions to implement methods of one or more embodiments.

BRIEF DESCRIPTION OF THE DRAWINGS

These and/or other aspects of embodiments will become apparent and more readily appreciated from the following description, taken in conjunction with the accompanying drawings of which.

DETAILED DESCRIPTION

Figure 1:
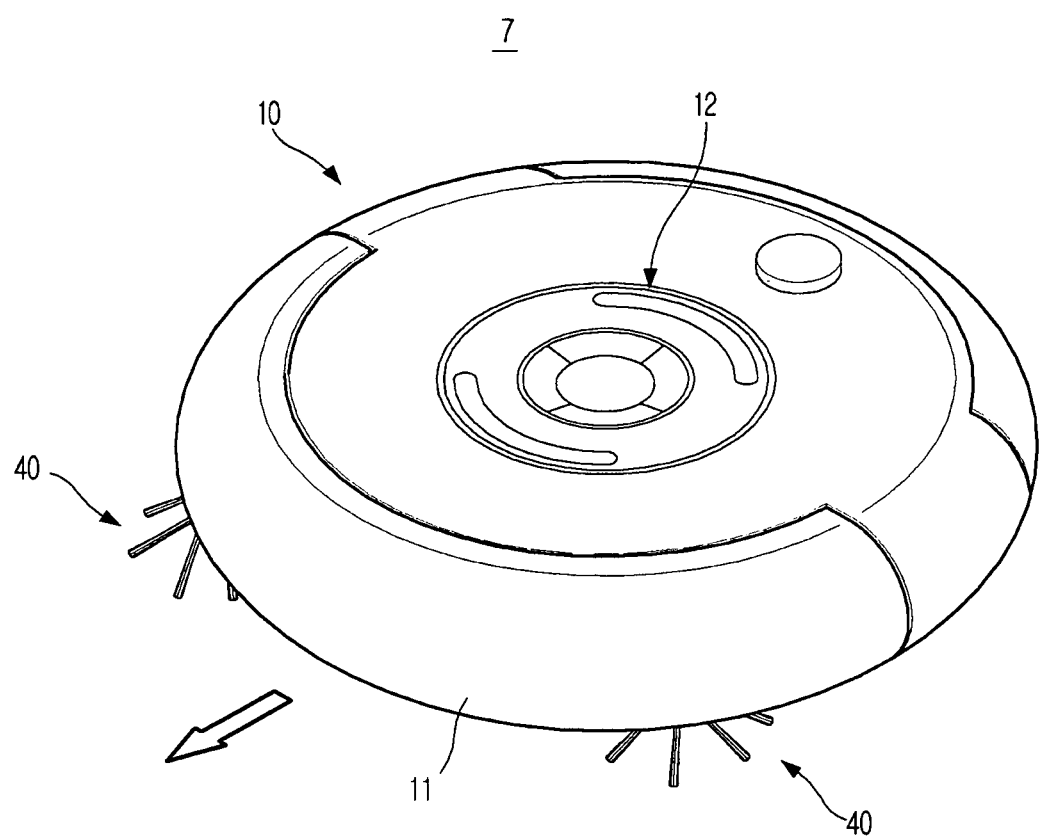
FIG. 1 is a top perspective view of a robot cleaner in accordance with an embodiment.

Reference will now be made in detail to embodiments, examples of which are illustrated in the accompanying drawings, wherein like reference numerals refer to like elements throughout.

Figure 2:
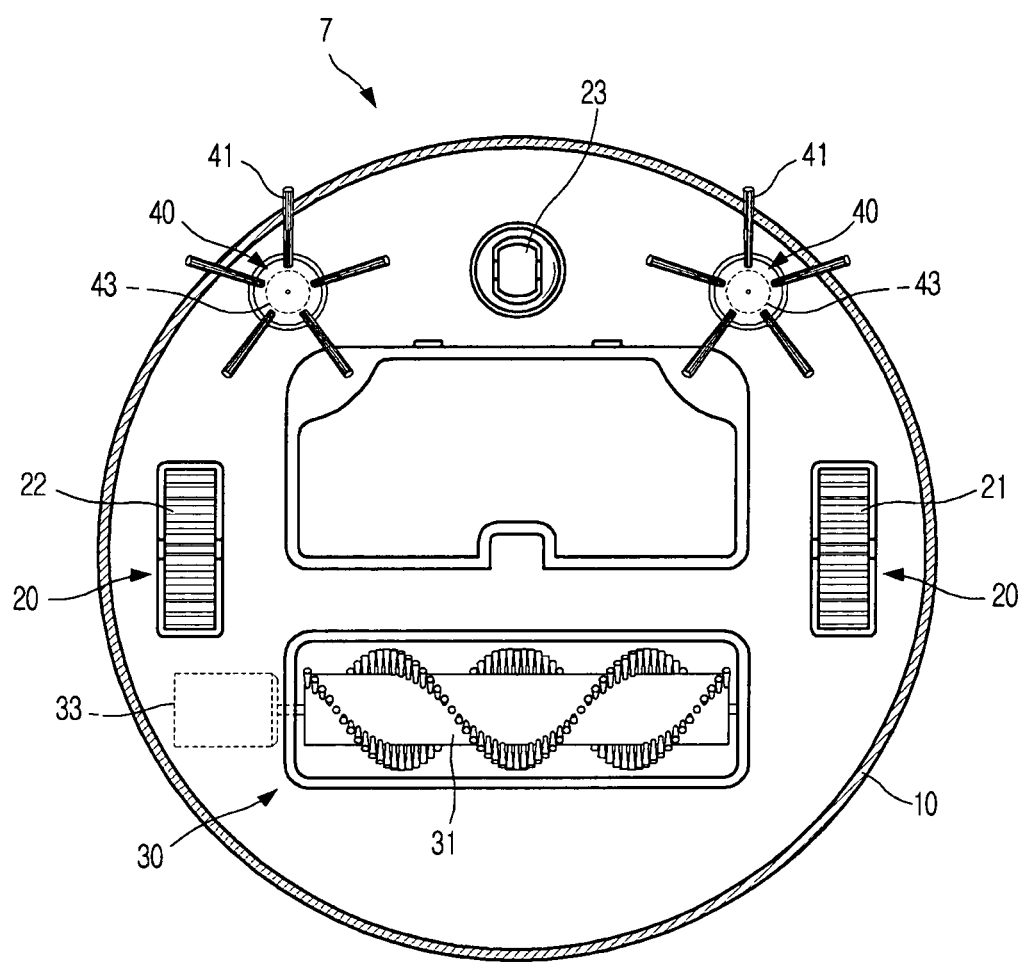
FIG. 2 is a bottom perspective view of the robot cleaner in accordance with an embodiment.

FIG. 1 is a top perspective view of a robot cleaner in accordance with an embodiment, and FIG. 2 is a bottom perspective view of the robot cleaner in accordance with an embodiment.

As shown in FIGS. 1 and 2, a robot cleaner 7 in accordance with an embodiment includes a main body 10 forming an external appearance of the robot cleaner 7, a driving device 20 installed on the lower part of the main body 10 to move the robot cleaner 7, and a brush device 30 and 40 to sweep or remove dust from a floor on which the robot cleaner 7 travels so as to perform cleaning.

In addition to the driving device 20 and the brush device 30 and 40, a contact sensor and a proximity sensor to sense an obstacle may be installed on the main body 10. For example, a bumper 11 installed on the front part of the main body 10 may be used to sense an obstacle, such as a wall, and an infrared sensor (or an ultrasonic sensor) installed on the bottom of the main body 10 may be used to sense an obstacle, such as a staircase. A display device 12 to inform a user of a state or operation of the robot cleaner 7 may be further installed on the main body 10.

The driving device 20 includes a pair of driving wheels 21 and 22 installed at both sides of the central part of the main body 10 to adjust movement of the robot cleaner 7, and a free wheel 23 installed at the front part of the main body 10 and changing a rotating angle according to conditions of the floor, on which the robot cleaner 7 moves. The free wheel 23 supports the robot cleaner 7 and is used to stabilize the pose of the robot cleaner 7 or to prevent the robot cleaner 7 from falling. The free wheel 23 may include a wheel in the shape of a roller or a caster.

Both driving wheels 21 and 22 may be driven forwardly or backwardly based on a command of a control unit 110, which will be described later, thus adjusting movement of the robot cleaner 7. For example, both driving wheels 21 and 22 are driven forwardly or backwardly, thus moving the robot cleaner 7 forwardly or backwardly. Further, the right driving wheel 22 is driven forwardly while the left driving wheel 21 is driven backwardly, thus rotating the robot cleaner 7 to the left, seen from the front part of the robot cleaner 7. On the other hand, the right driving wheel 22 is driven backwardly while the left driving wheel 21 is driven forwardly, thus rotating the robot cleaner 7 to the right, seen from the front part of the robot cleaner 7.

The brush device 30 and 40 includes a main brush unit 30 to sweep or remove dust from the floor, and side brush units 40 installed at both sides of the front part of the bottom of the main body 10.

The main brush unit 30 includes a drum-shaped rotary brush 31 (hereinafter, referred to as a main brush) rotated in a roller type with respect to the floor so as to sweep or remove dust from the floor, and a main brush motor 33 to rotate the main brush 31.

The side brush units 40 are installed at both sides of the front part of the bottom of the main body 10 at a designated interval. Each of the side brush units 40 includes a rotary brush 41 (hereinafter, referred to as a side brush) rotated horizontally with respect to the floor, and a side brush motor 43 to rotate the side brush 41.

Figure 3:
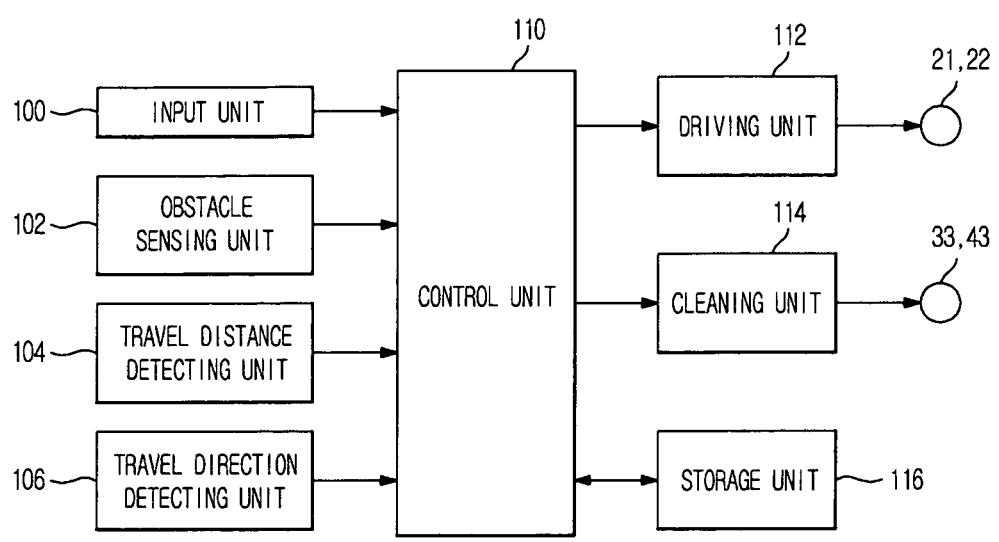
FIG. 3 is a control block diagram of the robot cleaner in accordance with an embodiment.

FIG. 3 is a control block diagram of the robot cleaner in accordance with an embodiment. The robot cleaner 7 includes an input unit 100, an obstacle sensing unit 102, a travel distance detection unit 104, a travel direction detection unit 106, the control unit 110, a travel driving unit 112, a cleaning apparatus driving unit 114, and a storage unit 116.

The input unit 100 includes a plurality of buttons provided on the upper part of the main body 10 or a remote controller (not shown) so as to receive a traveling or cleaning command input from a user.

The obstacle sensing unit 102 serves to sense an obstacle, such as furniture, office equipment, or a wall, installed in a cleaning area where the robot cleaner 7 travels. The obstacle sensing unit 102 transmits ultrasonic waves in a travel route of the robot cleaner 7 and receives ultrasonic waves reflected by an obstacle, thereby sensing whether or not the obstacle is present and the direction of the obstacle. Here, the obstacle sensing unit 102 may include an infrared sensor including a plurality of infrared light emitting elements to transmit infrared light and a plurality of infrared light receiving elements to receive infrared light reflected by an obstacle.

The travel distance detection unit 104 serves to detect a travel distance of the robot cleaner 7. The travel distance detection unit 104 measures rotations of the driving wheels 21 and 22 through an encoder, thus detecting the travel distance of the robot cleaner 7.

The travel direction detection unit 106 serves to detect a moving direction of the robot cleaner 7 and a rotating angle of the robot cleaner 7. The travel direction detection unit 106 may include a rotating angle sensor, such as a gyro sensor, to sense the rotating angle of the robot cleaner 7.

The control unit 110 controls the overall operation of the robot cleaner 7. The control unit 110 controls the robot cleaner 7 such that the robot cleaner 7 performs cleaning using zigzag travel as a basic cleaning traveling manner, when a cleaning command is input to the robot cleaner 7, and performs cleaning using random travel as a finishing cleaning traveling manner so as to clean areas skipped during the zigzag travel.

The travel driving unit 112 drives the driving wheels 21 and 22 installed on the bottom of the main body 10 of the robot cleaner 7 so as to perform direction change, such as rotation, while autonomously traveling the cleaned area without collision with a wall or an obstacle based on position data recognized by the control unit 110 and obstacle data sensed by the obstacle sensing unit 102.

The cleaning device driving unit 114 drives the main and side brush motors 33 and 43 so as to inhale foreign substances, such as dust, from the floor of the cleaned area on which the robot cleaner 7 travels, according to a control signal of the control unit 110 so as to perform a cleaning operation.

The storage unit 116 stores travel pattern and travel route predetermined according to the cleaning command of the robot cleaner 7, and data of an obstacle sensed during a traveling process of the robot cleaner 7.

Hereinafter, the above robot cleaner 7 and a method of controlling travel thereof will be described in detail.

The robot cleaner 7 in accordance with an embodiment performs cleaning in both the zigzag travel manner and the random travel manner. Further, the robot cleaner 7 employs an improved zigzag travel method so as to maintain the zigzag travel pattern, if an obstacle is sensed during the zigzag travel. First, the improved zigzag travel method employed by the robot cleaner 7 will be described.

Figure 4:
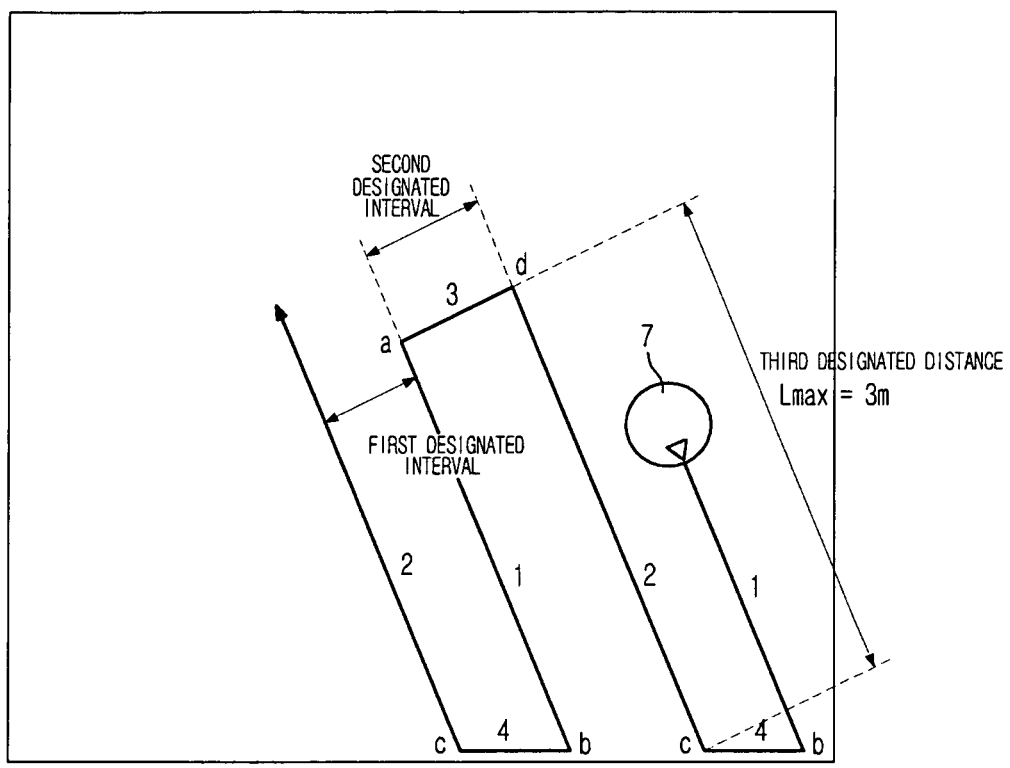
FIG. 4 is a view illustrating a basic zigzag travel trajectory of the robot cleaner in accordance with an embodiment.

FIG. 4 is a view illustrating a basic zigzag travel trajectory of the robot cleaner in accordance with an embodiment.

In FIG. 4, a basic cleaning traveling process of the robot cleaner 7 is achieved in the order of travel 1, travel 4, travel 2, travel 3, travel 1, and so on. Here, in the travel 1, the forward direction of the robot cleaner 7 at the point of time when the robot cleaner 7 receives a cleaning command is set to a cleaning direction, and the robot cleaner 7 moves in the cleaning direction until the robot cleaner 7 senses an obstacle. In the travel 4, when the robot cleaner 7 senses the obstacle during the travel 2, the robot cleaner 7 changes direction, and perform obstacle following travel up to a point which is separated from a line of the travel 1 by a first designated interval. Here, the first designated interval is set to be in a range from a width (Wmin+α1; minimum) of the main brush unit to a width (Wmin+α2; maximum) obtained by adding the width of the main brush unit and a width of the side brush unit. Judgment as to whether or not the robot cleaner 7 moves to the point separated from the line of the travel 1 by the first designated interval is obtained by accumulative calculation using an obstacle following travel distance and a rotating angle. In the travel 2, the robot cleaner 7 moves by a third designated distance in the opposite direction of the travel 1 after the travel 4. Here, the third designated distance (Lmax) may be set to 3 m, calculated in consideration of the size of a general room of a house. However, if the size of the room is small or large, the third designated distance (Lmax) may be set to a length greater or smaller than 3 m. In the travel 3, the robot cleaner 7 changes direction after the travel 2, and moves up to a point which is separated from a line of the travel 2 by a second designated interval.

Prior to the above-described travels 1, 4, 2, and 3, rotations a, b, c, and d are respectively performed. In the rotation a, the robot cleaner 7 is rotated to the left, after the third travel, until the forward direction of the robot cleaner 7 coincides with the cleaning direction. In the rotation b, the robot cleaner 7 is rotated to the right until the front obstacle sensor does not sense an obstacle. At this time, the fourth travel, i.e., the obstacle following travel, is performed. The fourth travel is performed in such a manner that, if the rotation b is performed and the left obstacle sensor does not sense an obstacle, the robot cleaner 7 is rotated to the left until the left obstacle sensor senses an obstacle, and then is rotated to the right until the left obstacle sensor does not sense the obstacle. In the rotation c, the robot cleaner 7 is rotated to the right after the travel 4 until the forward direction of the robot cleaner 7 coincides with the opposite direction to the cleaning direction. In the rotation d, the robot cleaner 7 is rotated to the left after the travel 2 until the forward direction of the robot cleaner 7 reaches an angle of 90 degrees to the left based on the opposite direction to the cleaning direction.

Through the above method, although the robot cleaner 7 travels at any angle with respect to the wall, the robot cleaner 7 may maintain the zigzag travel pattern while maintaining a designated interval with the travel route. Although FIG. 4 illustrates the zigzag travel method in which the robot cleaner 7 is rotated to the right after the travel 1 to perform the obstacle following travel, the robot cleaner 7 may perform the zigzag travel method in the opposite direction such that the robot cleaner 7 is rotated to the left after the travel 1 to perform the obstacle following travel. In this case, the rotations a, b, c, and d are respectively configured such that the robot cleaner 7 is rotated to the opposite direction.

Figure 5:
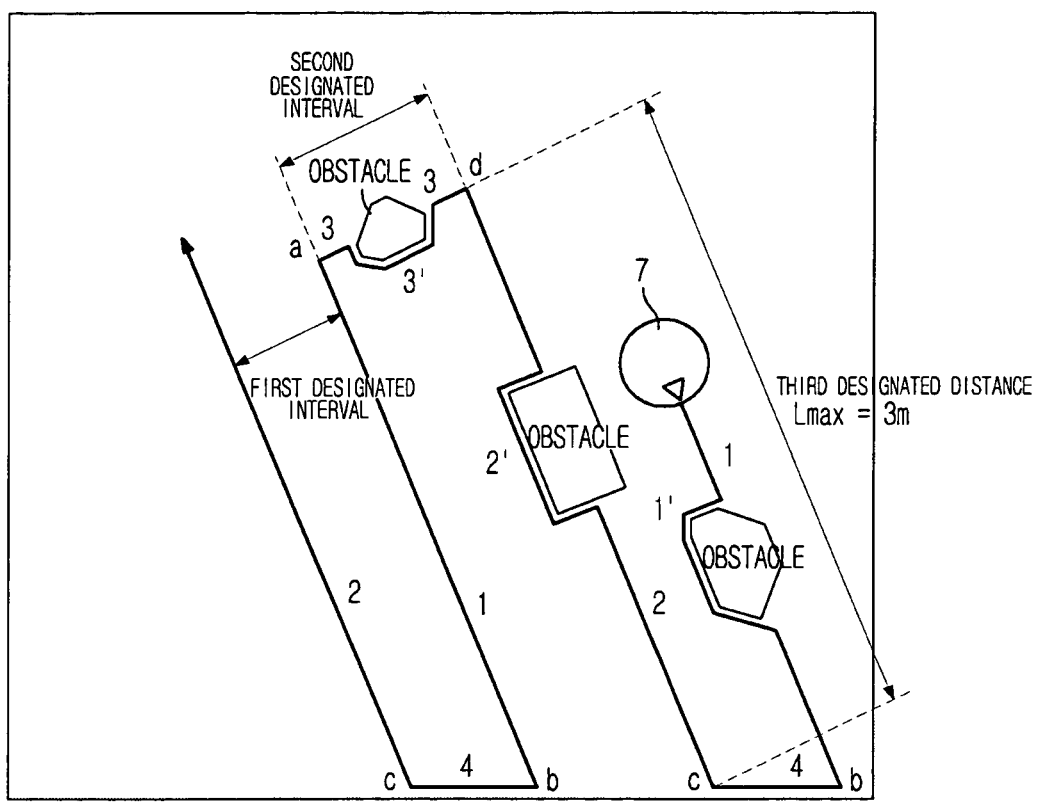
FIG. 5 is a view illustrating a first obstacle avoidance travel trajectory of the robot cleaner in accordance with an embodiment.

FIG. 5 is a view illustrating a first obstacle avoidance travel trajectory of the robot cleaner in accordance with an embodiment.

FIG. 5 illustrates a case in which, although the robot cleaner 7 senses an obstacle, the obstacle is small enough to allow the robot cleaner 7 to be returned to the line of the travel prior to the obstacle following travel.

In FIG. 5, when the robot cleaner 7 senses an obstacle during the travel 1, the robot cleaner 7 performs obstacle following travel in the leftward direction of the obstacle, and then when the robot cleaner 7 again encounters the route of the travel 1, the robot cleaner 7 again performs the travel 1 at the position thereof. Judgment as to whether or not the robot cleaner 7 again encounters the route of the travel 1 during the obstacle following travel is achieved using a rotating angle sensor, such as a gyro sensor, and an encoder. That is, an obstacle following travel distance of the robot cleaner 7 is obtained using the encoder, and a rotating angle of the forward direction of the robot cleaner 7 is obtained using the gyro sensor. When the obstacle following travel distance and the rotating angle are obtained, a travel distance of the robot cleaner 7 in the direction of the travel 1 and a separation distance of the robot cleaner 7 from the route of the travel 1 may be easily calculated. Concretely, if the separation distance reaches zero, it is judged that the robot cleaner 7 again encounters the route of the travel 1.

In principle, when the robot cleaner 7 senses an obstacle during the travel 1, the robot cleaner 7 changes from the travel 1 to the travel 4 and thus performs the travel 1, i.e., the obstacle following travel, until the robot cleaner 7 encounters the line of the next travel, i.e., the route of the travel 2. However, if the obstacle is present, as shown in FIG. 5, although the robot cleaner 7 continues the obstacle following travel, the robot cleaner 7 does not encounter the route of the travel 2. Therefore, the robot cleaner 7 changes from the travel 1 to travel 1' being the obstacle following travel, and, if it is judged that the robot cleaner 7 encounters the line of the travel 1, is returned to the travel 1, thus being returned to the zigzag travel pattern. Here, the travel 1' is substantially the same as the travel 4, but is distinguished from the travel 4 in order to express the travel returned to the travel 1.

During the travel 2 and the travel 3 performed after the travel 4, the obstacle following travel is performed through the above method. However, if an obstacle is sensed during the third travel and the fourth travel, the obstacle following travel is performed in the leftward direction of the obstacle.

Although FIG. 5 limits the obstacle following travel during the respective travels to be individually performed in the leftward or the rightward direction of the obstacle, the obstacle following travel during all the travels may be limited to be performed in the rightward or the leftward direction of the obstacle or may be limited to be performed in a random direction.

Figure 6:
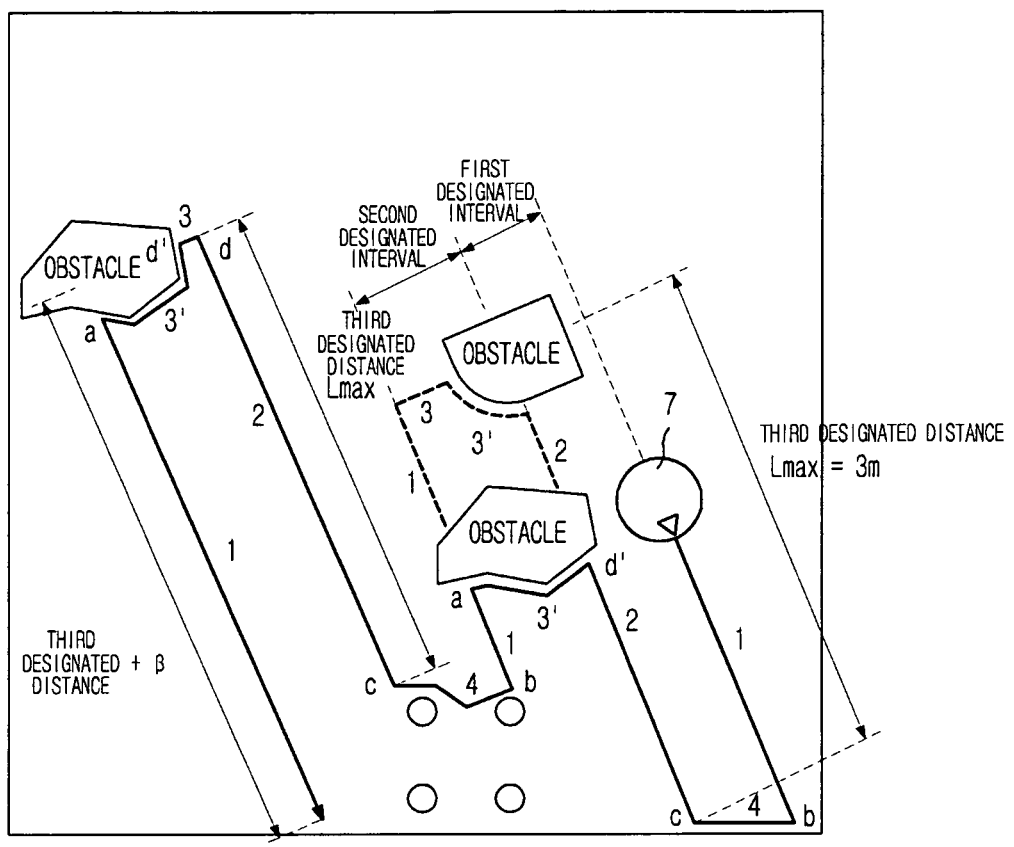
FIG. 6 is a view illustrating a second obstacle avoidance travel trajectory of the robot cleaner in accordance with an embodiment.

FIG. 6 is a view illustrating a second obstacle avoidance travel trajectory of the robot cleaner in accordance with an embodiment.

FIG. 6 illustrates a case in which, if the robot cleaner 7 senses an obstacle during the zigzag travel, performs the obstacle following travel, and then encounters a route of the next rectilinear travel other than a route of the travel just before the obstacle following travel, the robot cleaner 7 performs the next rectilinear travel at this position. As shown in FIG. 6, if the robot cleaner 7 senses an obstacle during the travel 2 and thus performs the obstacle following travel, the robot cleaner 7 may encounter a route of the next travel, i.e., the travel 3, or encounter a route of the next travel but one, i.e., the travel 1. However, if the robot cleaner 7 senses an obstacle during the travel 3 and thus performs the obstacle following travel, the robot cleaner 7 encounters a route of the next travel, i.e., the travel 1.

When the robot cleaner 7 senses the obstacle during the travel 2, the robot cleaner 7 performs rotation d' and performs travel 3', i.e., the obstacle following travel, and then when the robot cleaner 7 encounters the route of the next travel, i.e., the travel 3, the robot cleaner 7 performs the travel 3 at this position. In the rotation d', the robot cleaner 7 is rotated to the left until the front obstacle sensor does not sense the obstacle. In the travel 3', the robot cleaner 7 performs the obstacle following travel up to a point separated from the route of the travel 2 by a second designated interval after the rotation d'.

Here, the obstacle following travel is achieved by repeating rotation of the robot cleaner 7 to the right until the right obstacle sensor senses an obstacle, if the rotation d' is performed and then the right obstacle sensor does not sense the obstacle, and then rotation of the robot cleaner 7 to the left, if the right obstacle sensor does not again sense the obstacle. Judgment as to whether or not the robot cleaner 7 encounters the route of the travel 1 is achieved using the gyro sensor and the encoder, as described above.

When the robot cleaner 7 senses an obstacle during the travel 2 or the travel 3, the robot cleaner 7 performs the rotation d' and the performs the travel 3', i.e., the obstacle following travel, and when the robot cleaner 7 encounters the route of the next travel, i.e., the travel 1, during the travel 3', the robot cleaner 7 performs the travel 1.

Figure 7:
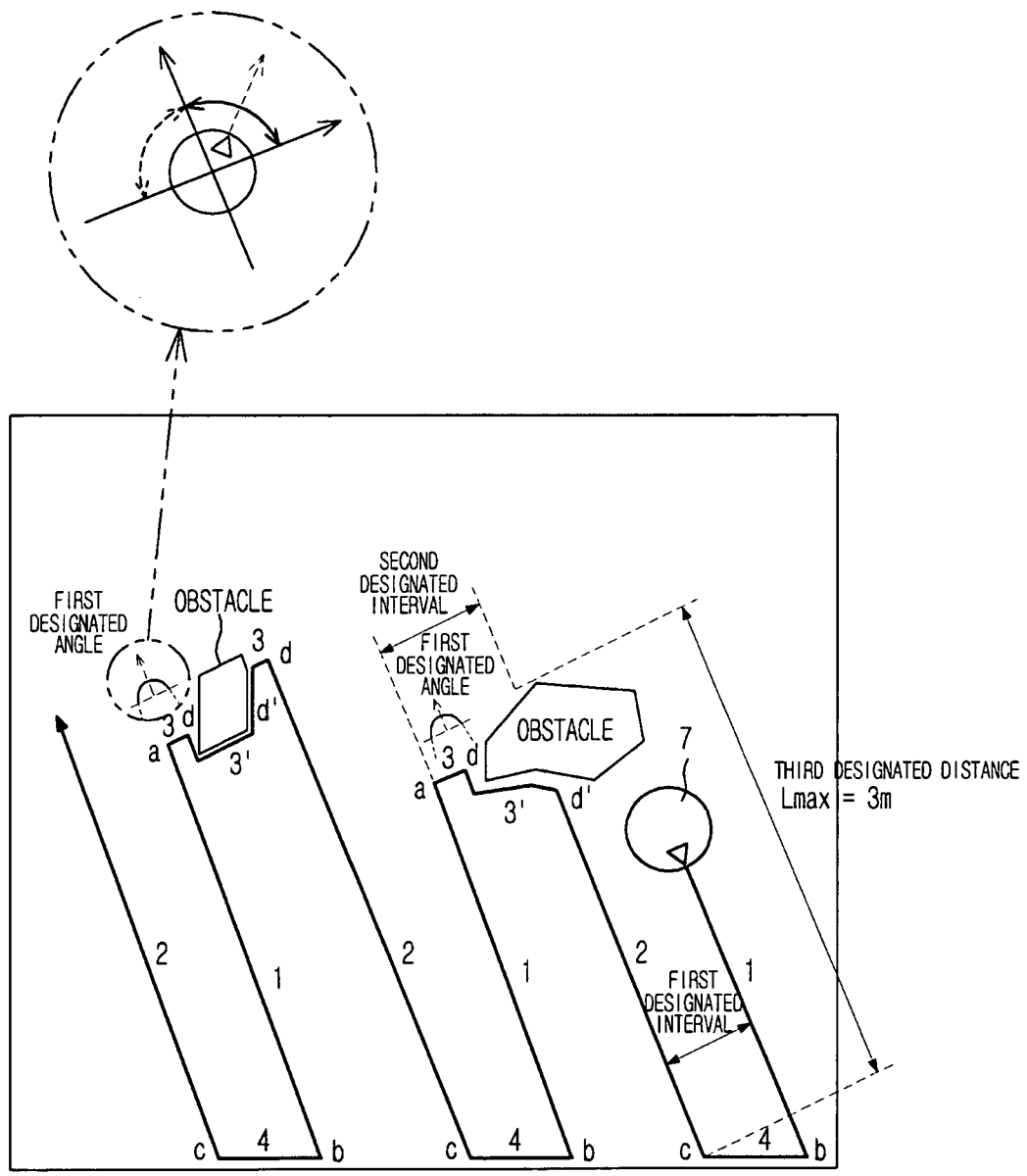
FIG. 7 is a view illustrating a third obstacle avoidance travel trajectory of the robot cleaner in accordance with an embodiment.

FIG. 7 is a view illustrating a third obstacle avoidance travel trajectory of the robot cleaner in accordance with an embodiment.

FIG. 7 illustrates case in which, if the robot cleaner 7 senses an obstacle during the travel 2 or the travel 3 and performs the obstacle following travel, and the forward direction of the robot cleaner 7 reaches a designated direction, the robot cleaner 7 judges that the forward direction of the robot cleaner 7 deviates from a zigzag travel direction, stops the obstacle following travel, and performs new travel 3 being parallel with the travel 3, performed when the robot cleaner 7 does not encounter an obstacle at this position.

If the robot cleaner 7 senses an obstacle during the travel 2, the robot cleaner 7 performs the rotation d' and then performs the obstacle following travel, i.e., the travel 3'. Thereafter, if the forward direction of the robot cleaner 7 is in the range within a first designated angle based on the direction opposite to the cleaning direction, i.e., the direction of the travel 2, before the robot cleaner 7 encounters the route of the travel 3 or the travel 1, the robot cleaner 7 performs new travel 3 being parallel with the travel 3, performed when the robot cleaner 7 does not encounter an obstacle at this position.

Here, the first designated angle may be a random angle, and be within ±90°. Particularly, if the first designated angle is +90°, as shown in FIG. 7, it is judged that the travel direction of the robot cleaner 7 deviates from the zigzag travel direction. Further, when the robot cleaner 7 performs the zigzag travel in the direction opposite to the direction of FIG. 7, if the first designated angle is −90°, it is judged that the travel direction of the robot cleaner 7 deviates from the zigzag travel direction.

Judgment as to whether or not the forward direction of the robot cleaner 7 is in the range within the first designated angle based on the direction opposite to the cleaning direction is achieved using the rotating angle sensor. That is, judgment as to whether or not the forward direction of the robot cleaner 7 is in the range within the first designated angle is achieved by accumulating the rotating angle of the forward direction of the robot cleaner 7 using the rotating angle sensor during the obstacle following travel.

In the same manner, if the robot cleaner 7 senses an obstacle during the travel 3, the robot cleaner 7 performs the rotation d' and then performs the obstacle following travel, i.e., the travel 3'. Thereafter, if the forward direction of the robot cleaner 7 is in the range within a first designated angle based on the direction opposite to the cleaning direction, i.e., the direction of the travel 2, before the robot cleaner 7 encounters the route of the travel 1, the robot cleaner 7 performs new travel 3 being parallel with the travel 3, performed when the robot cleaner 7 does not encounter an obstacle at this position. Here, the first designated angle may be a random angle, and be within ±90°.

Figure 8:
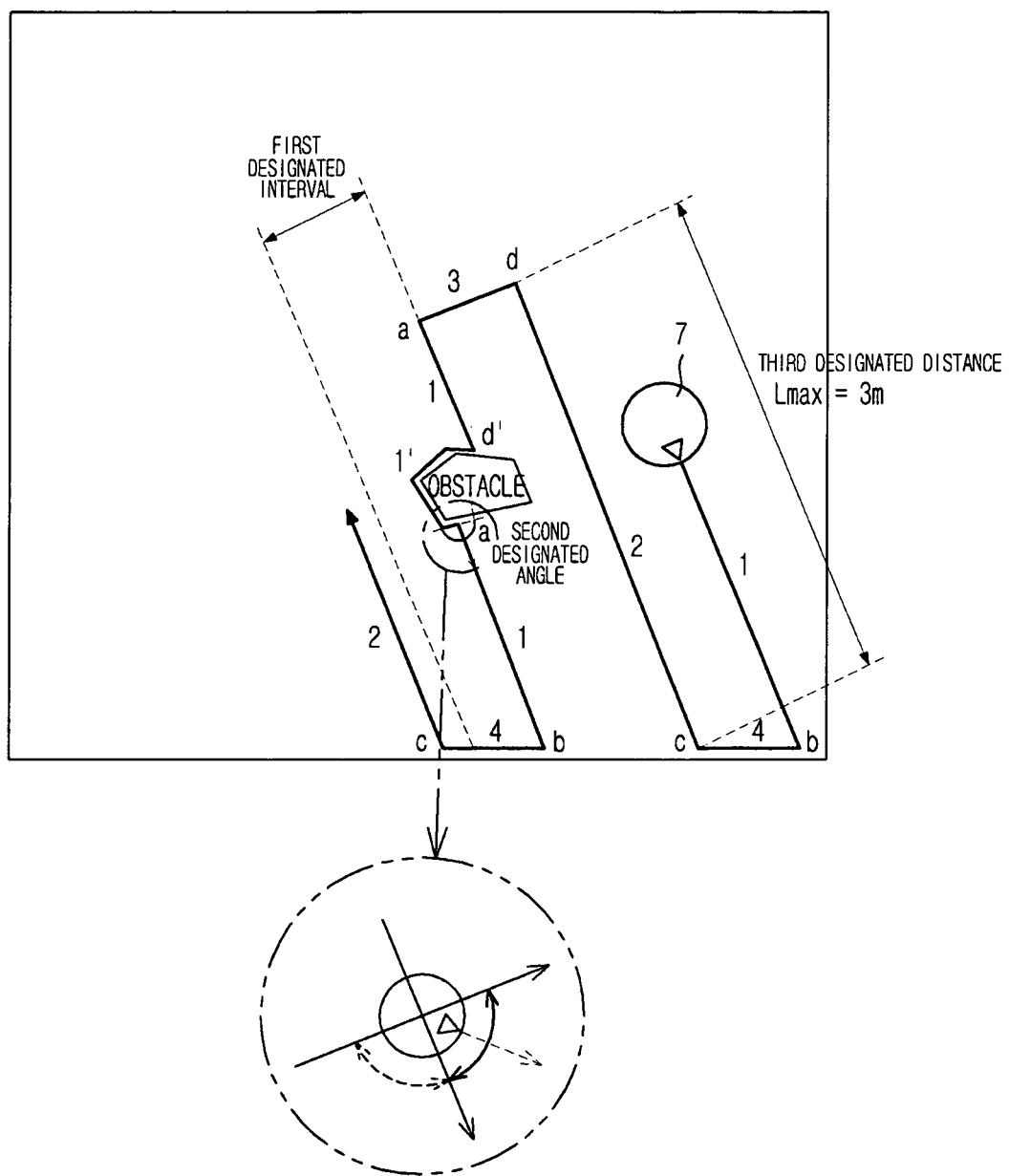
FIG. 8 is a view illustrating a fourth obstacle avoidance travel trajectory of the robot cleaner in accordance with an embodiment.

FIG. 8 is a view illustrating a fourth obstacle avoidance travel trajectory of the robot cleaner in accordance with an embodiment.

As shown in FIG. 8, if the robot cleaner 7 senses an obstacle during the travel 1, the robot cleaner 7 performs the rotation d' and then performs the obstacle following travel, i.e., the travel 1'. Thereafter, if the forward direction of the robot cleaner 7 is in a range within a second designated angle based on the cleaning direction, i.e., the direction of the travel 1, before the robot cleaner 7 encounters the route of the travel 1 prior to the obstacle following travel or the route of the travel 2 after the obstacle following travel, the robot cleaner 7 performs new travel 1 being parallel with the travel 1, performed when the robot cleaner 7 does not encounter an obstacle at this position.

Here, the second designated angle may be a random angle, and be within ±90°. Particularly, if the second designated angle is −90°, as shown in FIG. 8, it is judged that the travel direction of the robot cleaner 7 deviates from the zigzag travel direction. Further, when the robot cleaner 7 performs the zigzag travel in the direction opposite to the direction of FIG. 8, if the second designated angle is +90°, it is judged that the travel direction of the robot cleaner 7 deviates from the zigzag travel direction.

Figure 9:
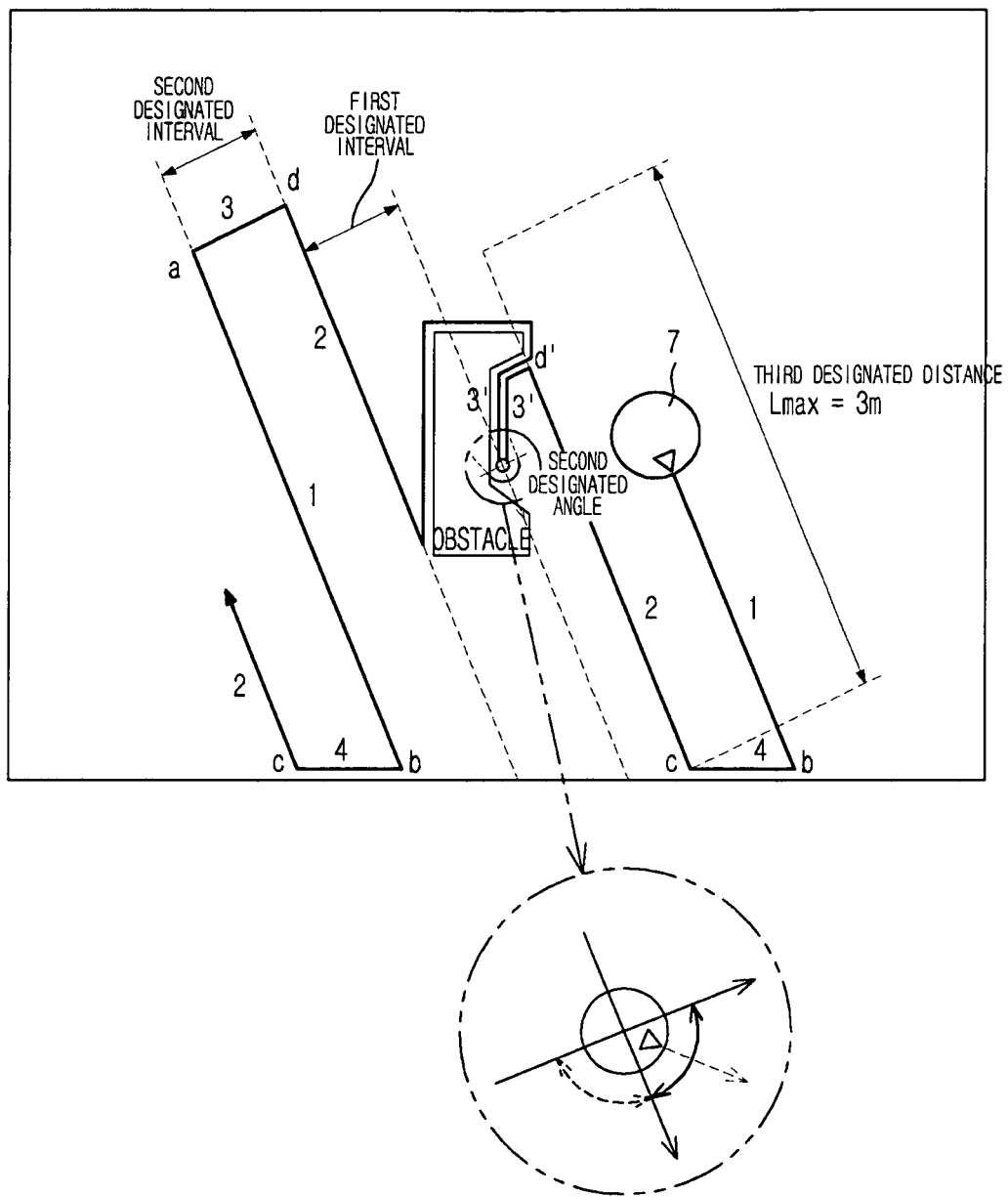
FIG. 9 is a view illustrating a fifth obstacle avoidance travel trajectory of the robot cleaner in accordance with an embodiment.

FIG. 9 is a view illustrating a fifth obstacle avoidance travel trajectory of the robot cleaner in accordance with an embodiment.

FIG. 9 illustrates case in which, if the robot cleaner 7 senses an obstacle during the travel 2 or the travel 3 and performs the obstacle following travel, if the forward direction of the robot cleaner 7 reaches a designated direction, it is judged that the robot cleaner 7 deviates from the zigzag travel pattern and the forward direction of the robot cleaner 7 is changed to the opposite direction and then the obstacle following travel of the robot cleaner 7 is performed.

That is, if the robot cleaner 7 senses an obstacle during the travel 2 or the travel 3, the robot cleaner 7 performs the rotation d' and then performs the obstacle following travel, i.e., the travel 3'. Thereafter, if the forward direction of the robot cleaner 7 is in a range within a second designated angle based on the cleaning direction, i.e., the direction of the travel 1, the robot cleaner 7 sets a route of virtual first travel at this position, changes the direction thereof to the opposite direction, and then performs the obstacle following travel. Thereafter, if the robot cleaner 7 is separated from the route of the virtual travel 1 by a first designated interval, the robot cleaner 7 performs the next travel, i.e., the travel 2. Here, the route of the virtual travel 1 may be set through the above method, or may be set at one point between a point where the obstacle following travel is started and a point where the direction of the robot cleaner 7 is changed to the opposite direction and the obstacle following travel in the opposite direction is started. FIG. 9 illustrates that the route of the virtual travel 1 is set to the point where the direction of the robot cleaner 7 starts to be changed to the opposite direction.

Judgment as to whether or not the forward direction of the robot cleaner 7 is in the range within the second designated angle based on the cleaning direction is achieved by accumulating the rotating angle of the robot cleaner 7 from the travel 2 or the travel 3 prior to the obstacle following travel using the rotating angle sensor, such as the gyro sensor.

Here, the second designated angle may be a random angle, and be within ±90°. Particularly, if the second first designated angle is −90°, as shown in FIG. 9, it is judged that the travel direction of the robot cleaner 7 deviates from the zigzag travel direction. Further, when the robot cleaner 7 performs the zigzag travel in the direction opposite to the direction of FIG.

9, if the second designated angle is +90°, it is judged that the travel direction of the robot cleaner 7 deviates from the zigzag travel direction.

Figure 10:
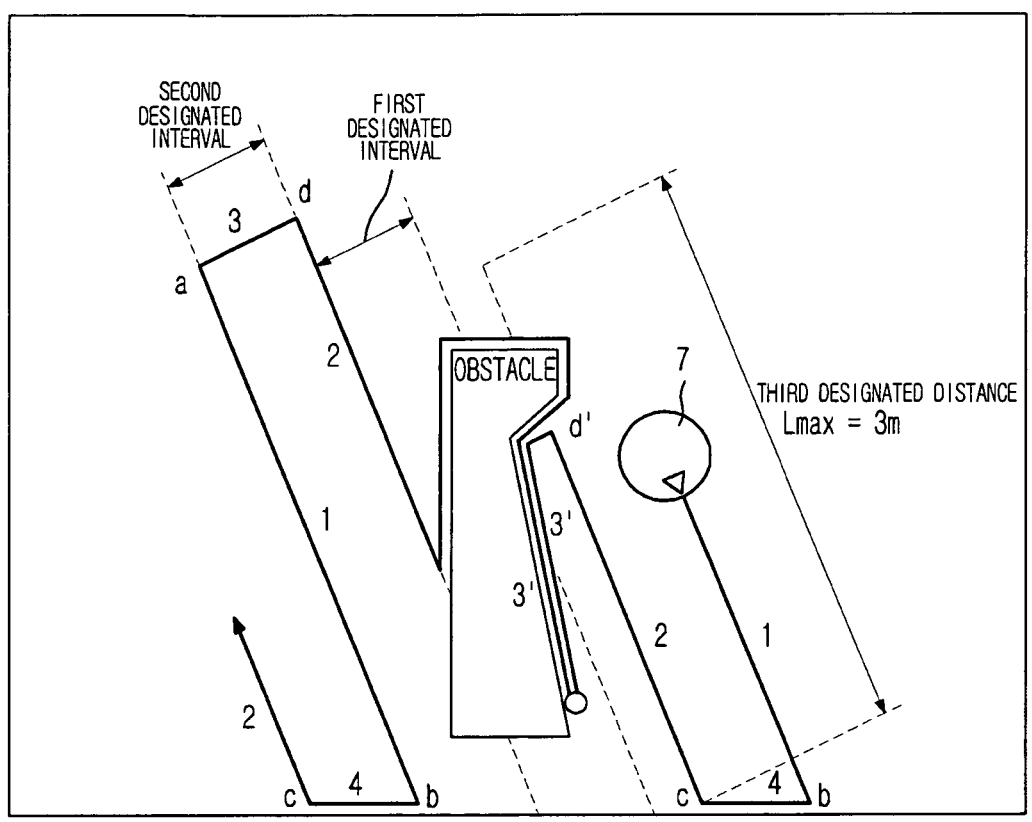
FIG. 10 is a view illustrating a sixth obstacle avoidance travel trajectory of the robot cleaner in accordance with an embodiment.

FIG. 10 is a view illustrating a sixth obstacle avoidance travel trajectory of the robot cleaner in accordance with an embodiment.

FIG. 10 illustrates case in which, if the robot cleaner 7 senses an obstacle during the travel 2 or the travel 3 and performs the obstacle following travel, when it is judged that an obstacle following travel distance of the robot cleaner 7 is excessively long, the direction of the robot cleaner 7 is changed to the opposite direction and then the obstacle following travel of the robot cleaner 7 is performed.

That is, if the robot cleaner 7 senses an obstacle during the travel 2 or the travel 3, the robot cleaner 7 performs the rotation d' and then performs the obstacle following travel, i.e., the travel 3'. At this time, if the obstacle following travel distance reaches a fourth designated distance, the robot cleaner 7 sets a route of virtual travel 1 at this position, changes the direction thereof to the opposite direction, and then performs the obstacle following travel, i.e., the travel 3'. Thereafter, if the robot cleaner 7 is separated from the route of the virtual travel 1 by a first designated interval, the robot cleaner 7 performs the next travel, i.e., the travel 2. Here, the virtual route of the travel 1 may be set through the above method, or may be set at one point between a point where the obstacle following travel is started and a point where the direction of the robot cleaner 7 is changed to the opposite direction and the obstacle following travel in the opposite direction is started. FIG. 10 illustrates that the route of the virtual travel 1 is set to the point where the direction of the robot cleaner 7 starts to be changed to the opposite direction.

Measurement of the obstacle following travel distance is achieved using the encoder, and judgment as to whether or not the robot cleaner 7 is separated from the route of the virtual travel 1 by the first designated interval is achieved using the gyro sensor and the encoder, as described above. Here, the fourth designated distance may be set to a random value, and be generally twice the first designated interval or the second designated interval.

Figure 11:
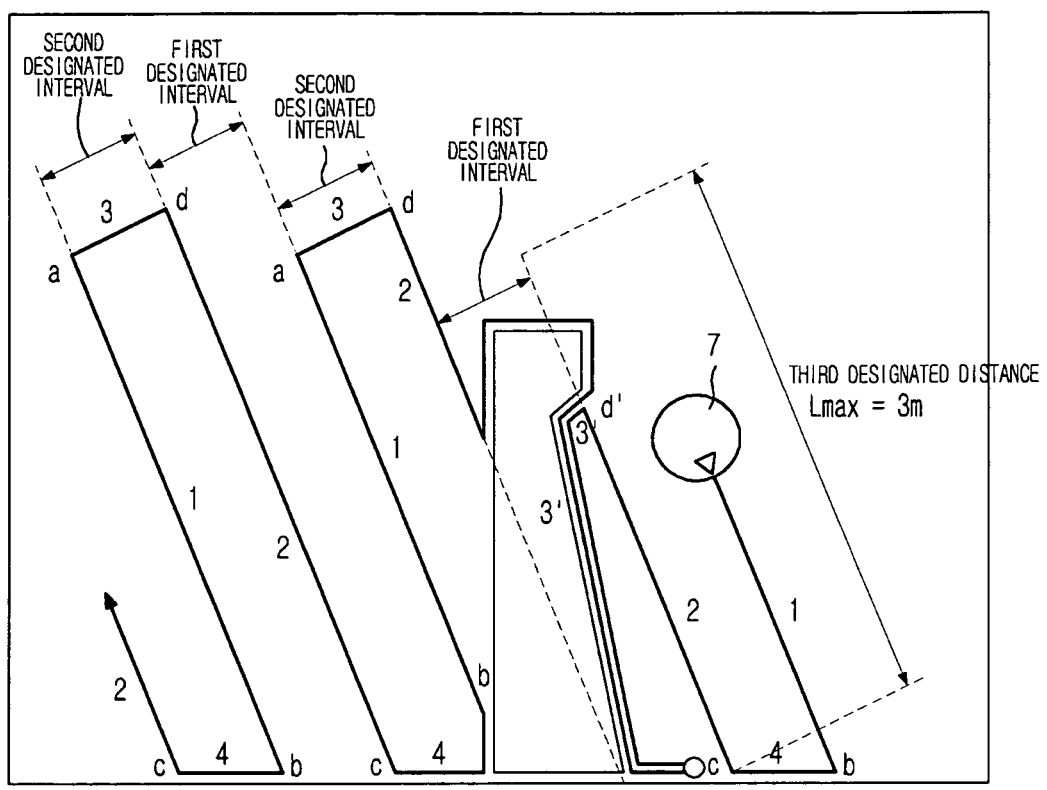
FIG. 11 is a view illustrating a seventh obstacle avoidance travel trajectory of the robot cleaner in accordance with an embodiment.

FIG. 11 is a view illustrating a seventh obstacle avoidance travel trajectory of the robot cleaner in accordance with an embodiment.

FIG. 11 illustrates case in which, if the robot cleaner 7 senses an obstacle during the travel 2 or the travel 3 and performs the obstacle following travel, when it is judged that an obstacle following travel distance of the robot cleaner 7 is excessively long and thus the robot cleaner 7 encounters the route of the travel prior to the obstacle following travel, the direction of the robot cleaner 7 is changed to the opposite direction and then the obstacle following travel of the robot cleaner 7 is performed.

That is, if the robot cleaner 7 senses an obstacle during the travel 2 or the travel 3, the robot cleaner 7 performs the rotation d' and then performs the obstacle following travel, i.e., the travel 3'. At this time, if the robot cleaner 7 encounters the route of the travel 2 prior to the obstacle following travel, the robot cleaner 7 changes the direction thereof to the opposite direction, and then performs the obstacle following travel, i.e., the travel 3'. Thereafter, if the robot cleaner 7 is separated from the route of the travel 2 prior to the travel 3' by a first designated interval, the robot cleaner 7 performs the next travel, i.e., the travel 2. Although FIG. 11 illustrates that the robot cleaner 7 encounter the route of the travel 2 prior to the obstacle following travel, the robot cleaner 7 may change the direction thereof to the opposite direction and then performs the obstacle following travel, if the robot cleaner 7 encounters the route of the virtual travel 1 or the travel 2 prior to the obstacle following travel. Here, judgment as to whether or not the robot cleaner 7 encounters the route of the travel 2 prior to the obstacle following travel is obtained by determining whether or not the separation distance of the robot cleaner 7 from the travel 2 reaches zero.

Figure 12:
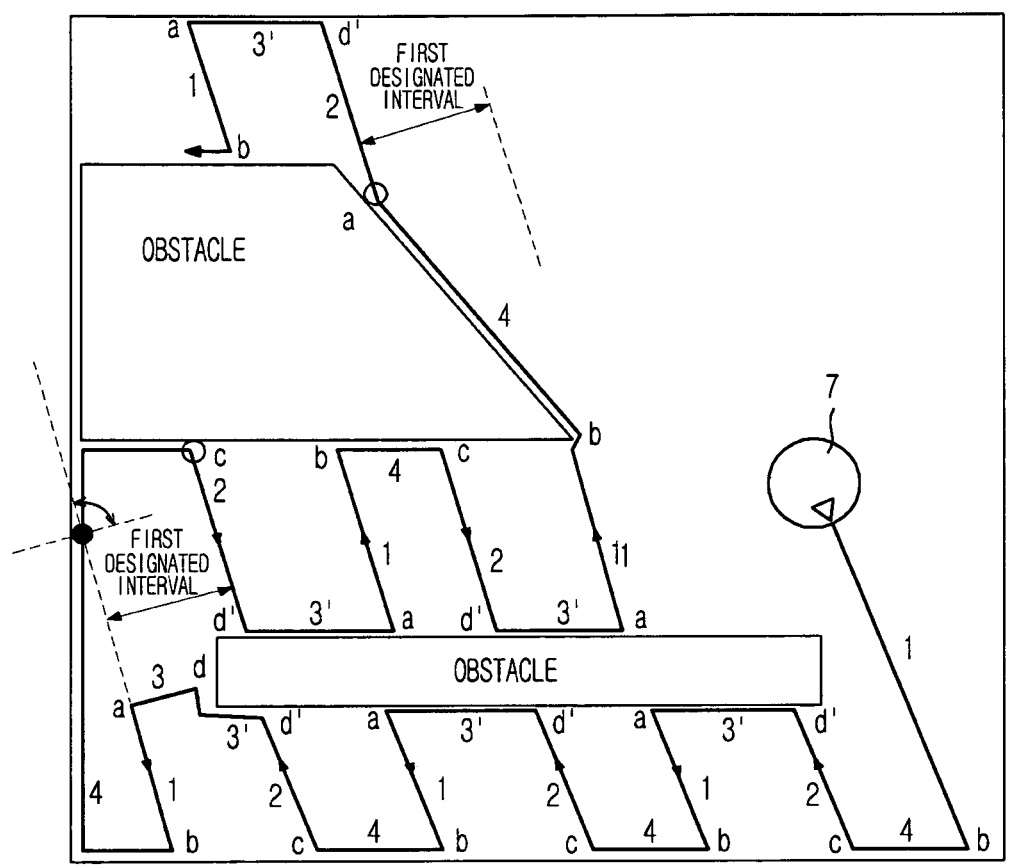
FIG. 12 is a view illustrating a first zigzag travel direction change trajectory in accordance with an embodiment.

FIG. 12 is a view illustrating a first zigzag travel direction change trajectory in accordance with an embodiment.

As shown in FIG. 12, if the robot cleaner 7 encounters an obstacle during the zigzag travel and thus performs the obstacle following travel, it is judged that the robot cleaner 7 enters an area opposite to the route of the zigzag travel prior to the obstacle following travel during the obstacle following travel, and the robot cleaner 7 is separated from the route of the zigzag travel prior to the obstacle following travel by a designated interval or the forward direction of the robot cleaner 7 reaches a designated direction, the robot cleaner 7 performs the zigzag travel in the opposite direction. Here, if the separation distance of the robot cleaner 7 from the route of the zigzag travel is zero and the forward direction of the robot cleaner 7 reaches a designated angle range based on the direction of the zigzag travel prior to the obstacle following travel, it is judged that the robot cleaner 7 enters the area opposite to the route of the zigzag travel prior to the obstacle following travel. This will be described in detail, with reference to FIG. 12, as follows.

In FIG. 12, a point where the robot cleaner 7 encounters the route of the virtual travel 1, being parallel with the travel 1 corresponding to the travel prior to the travel 4, other than the next travel during the travel 4 is expressed by a black circle. When the robot cleaner 7 encounters this point, the robot cleaner 7 is returned to the travel 1. However, the robot cleaner 7 may not be returned to the travel 1 in the same direction as the direction prior to the obstacle following travel due to the direction of an obstacle. That is, if it is sensed that the forward direction of the robot cleaner 7 is the right based on the opposite direction of the travel 1 prior to the obstacle following travel, it is judged that the robot cleaner 7 enters the area opposite to the route of the zigzag travel. At this time, if the direction of the zigzag travel is changed and thus the travel 2 after the travel 4 is performed in the same direction as the direction of the travel 1, the robot cleaner may be blocked by the obstacle.

Therefore, if the robot cleaner 7 is separated from the route of the travel 1 prior to the obstacle following travel by a designated interval or if the forward direction of the robot cleaner 7 reaches a designated direction, the robot cleaner 7 performs the zigzag travel in the opposite direction while performing the travel 2 in the same direction as the direction of the travel 1. FIG. 12 illustrates that the robot cleaner 7 performs the obstacle following travel until the robot cleaner 7 moves to be separated from the route of the travel 1 toward the opposite area by a first designated interval, and then performs the travel 2 in the opposite direction.

Here, judgment as to whether or not the robot cleaner 7 again encounters the route of the travel 1 is easily achieved using the obstacle following travel distance and the rotating angle obtained by the gyro sensor and the encoder, as described above. That is, the judgment as to whether or not the robot cleaner 7 again encounters the route of the travel 1 is easily achieved by searching for a point where the separation distance of the robot cleaner 7 from the route of the travel 1 reaches zero. Further, judgment as to whether or not the forward direction of the robot cleaner 7 coincides with the designated direction is achieved by accumulating the rotating angle of the robot cleaner 7 during the obstacle following travel.

Figure 13:
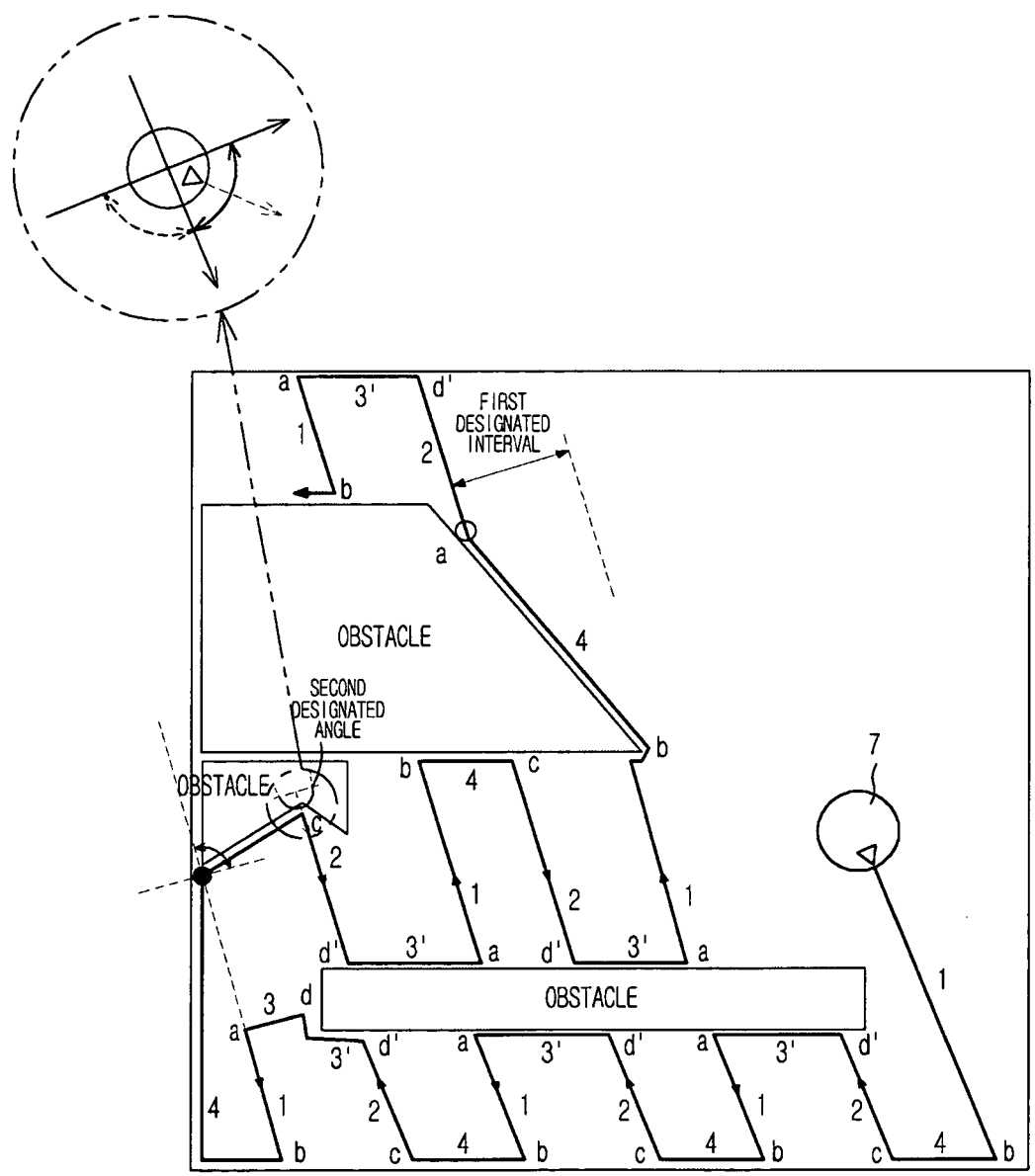
FIG. 13 is a view illustrating a second zigzag travel direction change trajectory in accordance with an embodiment.

FIG. 13 is a view illustrating a second zigzag travel direction change trajectory in accordance with an embodiment.

The second zigzag travel direction change trajectory of FIG. 13 is the same as that of FIG. 12 in that it is judged that the robot cleaner 7 enters an area opposite to the direction of the zigzag travel, but differs from that of FIG. 12 in that a point of time when the zigzag travel in the opposite direction is performed is determined based on the forward direction of the robot cleaner 7 other than the separation distance of the robot cleaner 7 from the route of the travel 1.

That is, if the robot cleaner 7 enters the area opposite to the direction of the zigzag travel during the obstacle following travel, i.e., the travel 4 and the forward direction of the robot cleaner 7 is in a range within a second designated angle based on the cleaning direction, i.e., the direction of the travel 1 prior to the obstacle following travel, it is judged that there is a high possibility that the travel 2 is not performed in the direction opposite to the cleaning direction, and thus the zigzag travel is performed under the condition that the second travel is performed in the cleaning direction.

Here, the second designated angle may be a random angle, and be within ±90°. Particularly, if the second first designated angle is −90°, as shown in FIG. 13, it is judged that the travel direction of the robot cleaner 7 deviates from the zigzag travel direction. Further, when the robot cleaner 7 performs the zigzag travel in the direction opposite to the direction of FIG. 13, if the second designated angle is +90°, it is judged that the travel direction of the robot cleaner 7 deviates from the zigzag travel direction.

Figure 14:
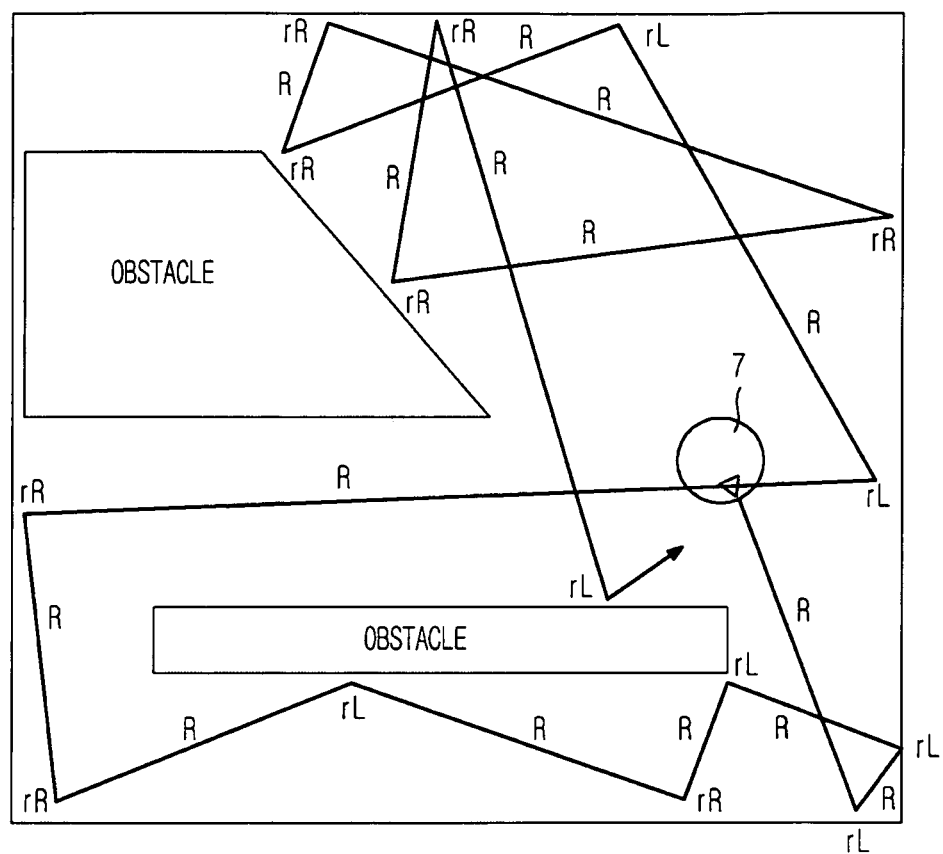
FIG. 14 is a view illustrating a random travel trajectory in accordance with an embodiment.

FIG. 14 is a view illustrating a random travel trajectory in accordance with an embodiment.

In FIG. 14, the random travel is performed by repeating travel R and rotation rL or rotation rR. In the travel R, the robot cleaner 7 rectilinearly travels while maintaining a current direction. During the travel R, when a left obstacle is first sensed, the robot cleaner 7 performs the rotation rR, or when a right obstacle is first sensed, the robot cleaner 7 performs the rotation rL. In the rotation rR, the robot cleaner 7 is rotated to the right until the left obstacle is not sensed, and then is additionally rotated to the right by a random angle of 0~120° without stoppage. Further, in the rotation rL, the robot cleaner 7 is rotated to the left until the right obstacle is not sensed, and then is additionally rotated to the left by a random angle of 0~120° without stoppage.

Figure 15:
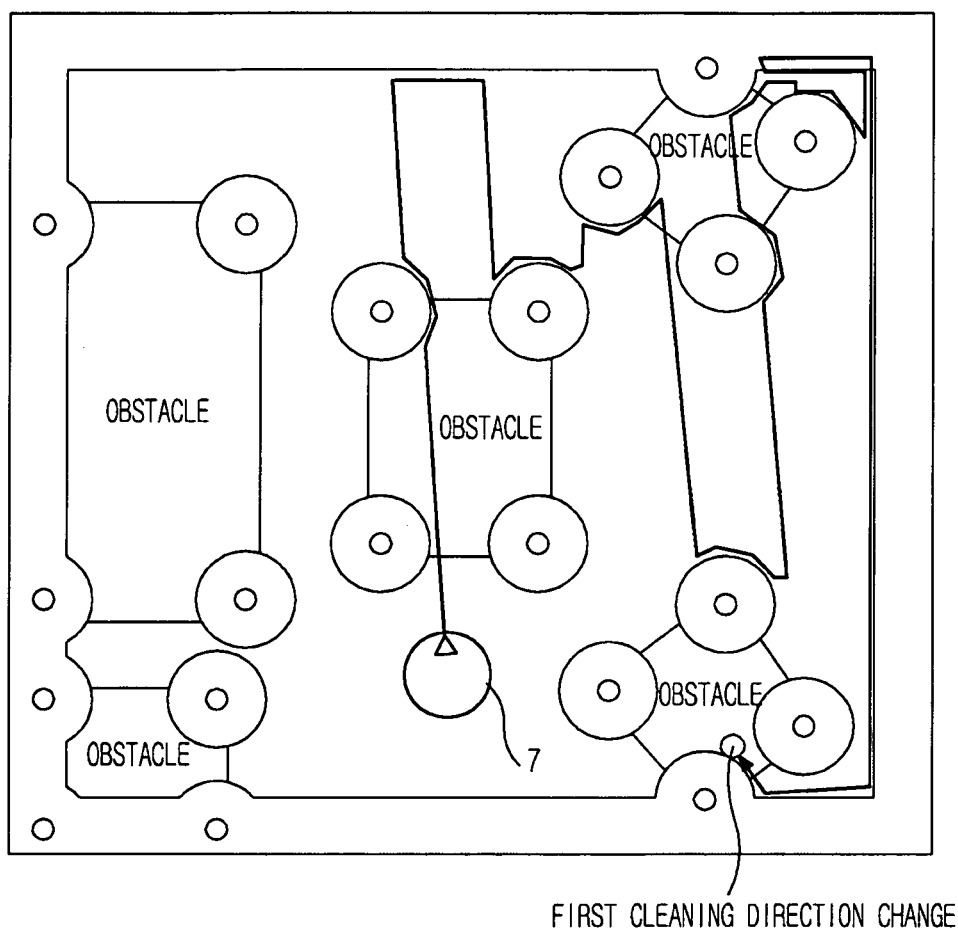
FIG. 15 is a view illustrating a first zigzag travel trajectory in accordance with an embodiment.
Figure 16:
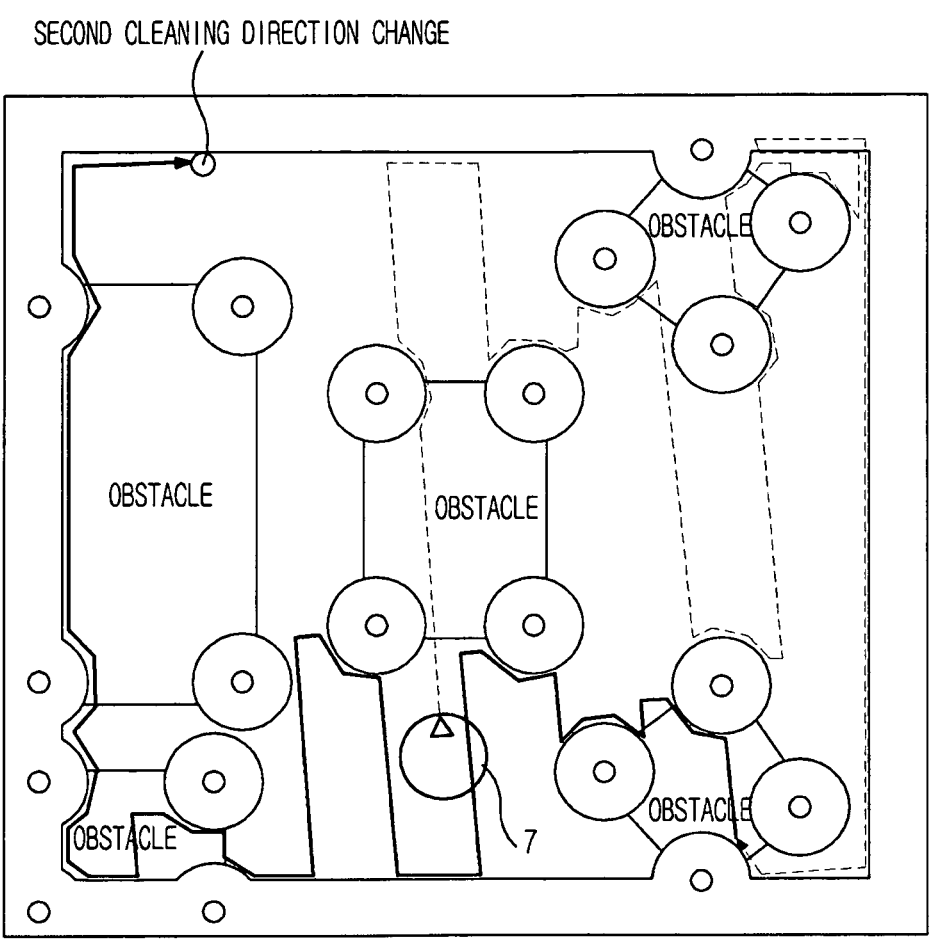
FIG. 16 is a view illustrating a second zigzag travel trajectory in accordance with an embodiment.
Figure 17:
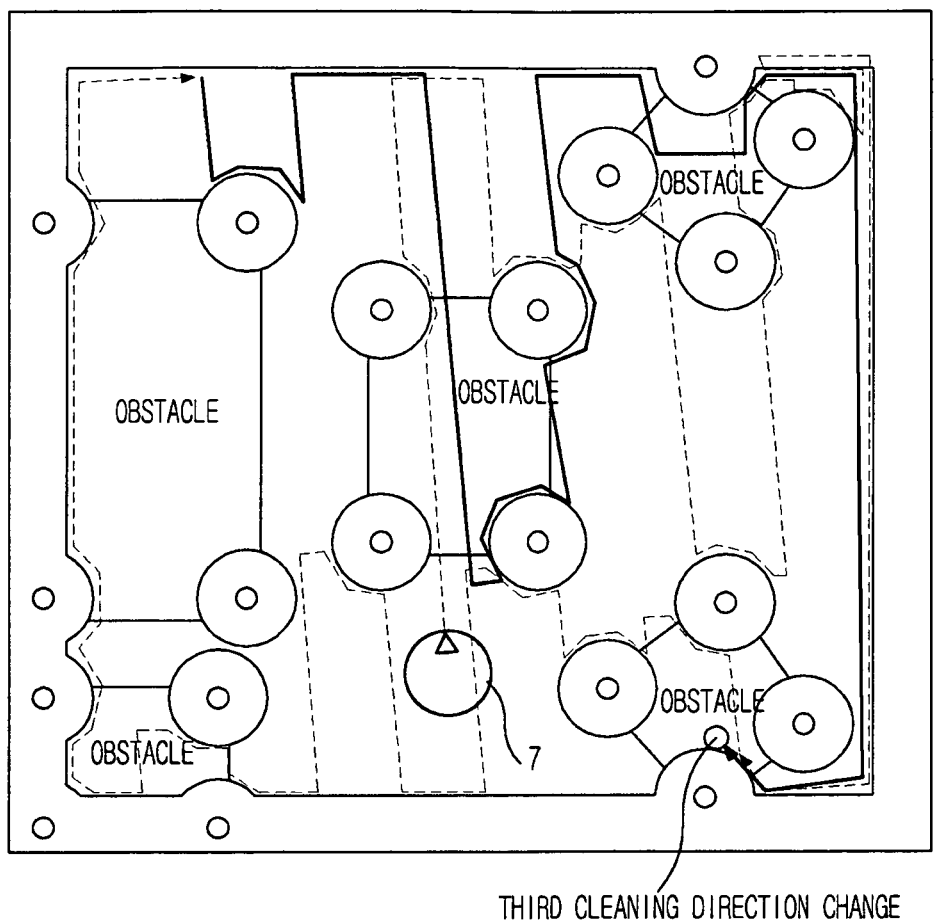
FIG. 17 is a view illustrating a third zigzag travel trajectory in accordance with an embodiment.

FIG. 15 is a view illustrating a first zigzag travel trajectory in accordance with an embodiment. FIG. 16 is a view illustrating a second zigzag travel trajectory in accordance with an embodiment. FIG. 17 is a view illustrating a third zigzag travel trajectory in accordance with an embodiment. With reference to FIGS. 15 to 17, when the robot cleaner 7 satisfies designated requirements during the zigzag travel, as shown in FIGS. 12 and 13, the robot cleaner 7 changes the direction of the zigzag travel. Although this will be described later, if the number of changes of the direction of the zigzag travel is more than a designated number, it is judged that it is time to finish the zigzag travel. The designated number may be set to three times in consideration of the size of a room of a general house, but may be changed according to the size of the room. As shown in FIGS. 15 to 17, when the direction of the zigzag travel is changed three times, it is judged that it is time to finish the zigzag travel, and the zigzag travel is changed to the random travel, as shown in FIG. 18.

Figure 18:
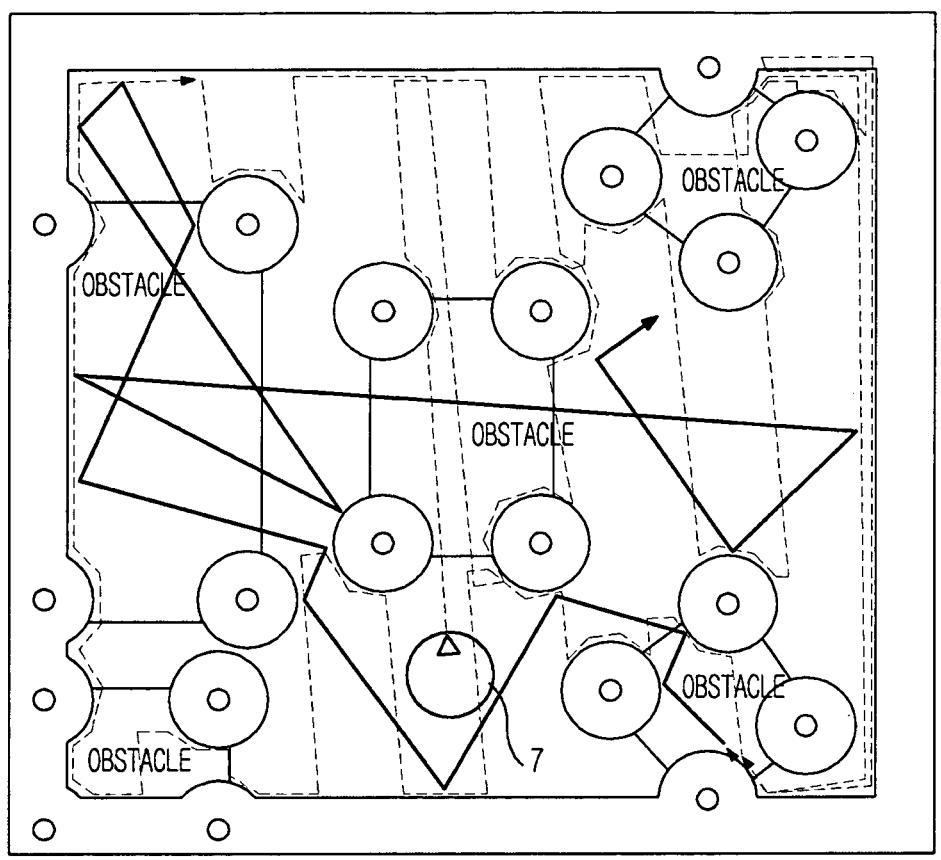
FIG. 18 is a view illustrating an overall cleaning travel trajectory in accordance with an embodiment.

FIG. 18 is a view illustrating an overall cleaning travel trajectory in accordance with an embodiment.

In FIG. 18, the robot cleaner 7 performs cleaning through the zigzag travel, and then performs cleaning through the random travel. The random travel is performed by cleaning areas skipped during the zigzag travel through a finishing cleaning traveling manner. Here, the finishing cleaning traveling manner refers to a manner to clean the areas, skipped during the zigzag, travel through the random travel. Although the random travel may be performed prior to the zigzag travel, the robot cleaner 7 may first perform cleaning through the zigzag travel, and then perform cleaning through the random travel. Hereinafter, a method of judging the time of the zigzag travel and the time of the random travel and judging whether or not the zigzag travel and the random travel are finished will be described.

If the number of changes of the direction of the zigzag travel is more than a designated number, the robot cleaner 7 judges that it is time to finish the zigzag travel. Further, if time of the zigzag travel is more than a designated time, the robot cleaner 7 may judge that it is time to finish the zigzag travel. The designated number may be set to three times in consideration of the size of a room of a general house. However, when the size of the room is large or small, the designated number may be set to a value smaller or greater than three times. Further, the designated time may be set to 20 minutes in consideration of the size of the room of the general house. However, when the size of the room is large or small, the designated time may be set to be shorter or longer than 20 minutes.

If a designated time, determined in proportion to the mean rectilinear travel distance of the random travel, elapses, the robot cleaner 7 judges that it is time to finish the random travel. Since the mean rectilinear travel distance of the random travel is in proportion to the size of a room, when the mean rectilinear travel distance is short, the random travel is performed for a short time, and when the mean rectilinear travel distance is long, the random travel is performed for a long time. The mean rectilinear travel distance corresponds to the mean of travel distances of the travel R in FIG. 12. In consideration of the size of the room of the general house, the random travel may be performed for 5 minutes (minimum) to 20 minutes (maximum). However, the time of the random travel may be increased or decreased in consideration of the size of the room. Further, if the number of changes of the direction of the random travel is more than a designated number or if the time of the random travel is more than a designated time, the robot cleaner 7 may judge that it is time to finish the random travel.

Through the above configuration, the robot cleaner 7 maintains a zigzag travel pattern while maintaining a designated interval with a travel route colliding with a wall even though the robot cleaner 7 collides with the wall at any angle, and employs an improved zigzag travel pattern enabling the robot cleaner 7 to maintain the zigzag travel pattern even though the robot cleaner 7 encounters an obstacle. Further, the robot cleaner 7 performs cleaning through random travel after the zigzag travel, thereby maximizing cleaning coverage.

In addition to the above-described embodiments, embodiments can also be implemented by executing computer readable code/instructions in/on a medium/media, e.g., a computer readable medium/media, to control the robot cleaner. The medium/media can correspond to any medium/media storing the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and other storage media, which may include computer readable code/instructions, data files, data structures, etc. The media may be storage in a distributed network, so that the computer readable code/instructions are stored and executed in a distributed fashion. The computer readable code/instructions may be executed by one or more processors or controllers. The computer readable code/instructions may also be executed and/or embodied in at least one application specific integrated circuit (ASIC) or Field Programmable Gate Array (FPGA).

Although a few embodiments have been shown and described, it would be appreciated by those skilled in the art that changes may be made in these shown and described embodiments without departing from the principles and spirit of the disclosure, the scope of which is defined in the claims and their equivalents.

What is claimed is:

1. A control method for cleaning an area using a robot cleaner comprising:
   moving the robot cleaner in a first travel pattern, the first travel pattern includes:
     a first travel path enabling the robot cleaner to proceed from one point in the area toward a designated wall;
     a second travel path parallel to the first travel path enabling the robot cleaner to move a distance from the designated wall;
     a third travel path enabling the robot cleaner to change a direction after the first travel path or the second travel path and then to travel until the robot cleaner is separated from the first travel path or the second travel path by designated intervals,
     wherein a route of the first travel path and a route of the second travel path respectively maintain the designated intervals;
   moving the robot cleaner alongside of an obstacle in an obstacle contour following path, if the robot cleaner encounters the obstacle while moving the robot cleaner in one of the first travel path and the second travel path;
   obtaining a separation distance of the robot cleaner in the obstacle contour following path in a perpendicular direction from the one of the first travel path and the second travel path;
   moving the robot cleaner in the other of the first travel path and the second travel path, if the separation distance reaches the designated intervals; and
   moving the robot cleaner in the one of the first travel path and the second travel path, if the separation distance reaches zero.

2. The control method according to claim 1, wherein an angle between the route of the first travel path and the designated wall is in the range of an angle of 0 to 180 degrees.

3. The control method according to claim 2, wherein the maintenance of the designated intervals between the route of the first travel path and the route of the second travel path includes:
   moving the robot cleaner in the route of the second travel path maintaining a first designated interval with the route of the first travel path; and
   moving the robot cleaner in the route of the first travel path maintaining a second designated interval with the route of the second travel path.

4. The control method according to claim 3, wherein the second travel path is performed by the robot cleaner until a distance of the route of the second travel pattern is more than a predetermined distance.

5. The control method according to claim 1, wherein the moving the robot cleaner in the first travel pattern is performed by:
   moving the robot cleaner alongside of an obstacle, if the robot cleaner encounters the obstacle during the first travel path;
   obtaining a separation distance of the robot cleaner from the route of the first travel path; and
   moving the robot cleaner in the second travel path, if the separation distance is more than the first designated interval.

6. The control method according to claim 1, wherein the moving the robot cleaner in the first travel pattern is performed by:
   moving the robot cleaner alongside of an obstacle, if the robot cleaner encounters the obstacle during the second travel path;
   obtaining a separation distance of the robot cleaner from the route of the second travel path; and
   moving the robot cleaner in the first travel path, if the separation distance is more than the second designated interval.

7. The control method according to claim 1, wherein the moving the robot cleaner in the first travel pattern is performed by:
   moving the robot cleaner alongside of an obstacle, if the robot cleaner encounters the obstacle during the second travel path; and
   moving the robot cleaner in the third travel path, if the sum total of a distance of the second travel path and a travel distance of the robot cleaner in a direction of the second travel path during movement of the robot cleaner alongside of the obstacle is more than a second predetermined distance.

8. The control method according to claim 1, wherein the moving the robot cleaner in the first travel pattern is performed by:
   moving the robot cleaner alongside of an obstacle, if the robot cleaner encounters the obstacle during the third travel path; and
   moving the robot cleaner in the first travel path, if the sum total of a distance of the third travel path and a travel distance of the robot cleaner in a direction of the third travel path during movement of the robot cleaner alongside of the obstacle is more than the second designated interval.

9. The control method according to claim 1, wherein the moving the robot cleaner in the first travel pattern is performed by:
   moving the robot cleaner alongside of an obstacle, if the robot cleaner encounters the obstacle during the second travel path; and
   moving the robot cleaner in the third travel path at the current position of the robot cleaner, if a forward direction of the robot cleaner is within a designated angle range based on a direction of the second travel path.

10. The control method according to claim 1, wherein the moving the robot cleaner in the first travel pattern is performed by:

moving the robot cleaner alongside of an obstacle, if the robot cleaner encounters the obstacle during the third travel path; and moving the robot cleaner in the third travel path at the current position of the robot cleaner, if a forward direction of the robot cleaner is within a designated angle range based on a direction of the third travel path.

11. The control method according to claim 1, wherein the moving the robot cleaner in the first travel pattern is performed by:

moving the robot cleaner alongside of an obstacle, if the robot cleaner encounters the obstacle during the first travel path; and moving the robot cleaner in the first travel path at the current position of the robot cleaner, if a forward direction of the robot cleaner is within a designated angle range based on a direction of the first travel path.

12. The control method according to claim 1, wherein the moving the robot cleaner in the first travel pattern is performed by:

moving the robot cleaner alongside of an obstacle, if the robot cleaner encounters the obstacle during the second travel path or the third travel path; and changing a direction of the robot cleaner and then moving the robot cleaner alongside of the obstacle in the changed direction, if a forward direction of the robot cleaner is within a designated angle range based on a direction of the second travel path and the third travel path or if a distance traveled alongside of the obstacle is more than a second designated distance.

13. The control method according to claim 12, wherein the moving the robot cleaner in a second travel path is performed, if the robot cleaner is separated from one point, between a point where the robot cleaner starts moving alongside of the obstacle and a point where the robot cleaner starts moving alongside of the obstacle in the changed direction, by the first designated interval.

14. The control method according to claim 1, wherein the moving the robot cleaner in the first travel pattern is performed by:

moving the robot cleaner alongside of an obstacle, if the robot cleaner encounters the obstacle during the second travel path or the third travel path;

obtaining a separation distance of the robot cleaner from the route of the second travel path; and changing a direction of the robot cleaner and then moving the robot cleaner alongside of the obstacle in the changed direction, if the separation distance is more than the designated intervals.

15. The control method according to claim 14, wherein the moving the robot cleaner in a second travel path is performed, if the robot cleaner is separated from one point, between a point where the robot cleaner starts moving alongside of the obstacle and a point where the robot cleaner starts moving alongside of the obstacle in the changed direction, by the first designated interval.

16. The control method according to claim 1, wherein the moving the robot cleaner in the first travel is performed by:

moving the robot cleaner alongside of an obstacle, if the robot cleaner encounters the obstacle during the first travel pattern;

judging whether or not the robot cleaner enters an area opposite to a direction of the first travel pattern, based on the route of the first travel pattern prior to the moving the robot cleaner alongside of the obstacle, during the traveling alongside of the obstacle; and changing the direction of the first travel pattern to the opposite direction and then moving the robot cleaner in the first travel pattern in the opposite direction, if the robot cleaner is separated from the route of the first travel pattern prior to moving the robot cleaner alongside of the obstacle by a designated interval, or a forward direction of the robot cleaner reaches a designated direction.

17. The control method according to claim 16, wherein it is judged that the robot cleaner enters the area opposite to the direction of the first travel pattern, based on the route of the first travel pattern prior to moving the robot cleaner alongside of the obstacle, during the movement of the robot cleaner alongside of the obstacle, if the separation distance of the robot cleaner from a route of the first travel pattern is more than the designated intervals and the forward direction of the robot cleaner is within the range in a designated angle based on the route of the first travel pattern prior to the movement of the robot cleaner alongside of the obstacle.

18. The control method according to claim 17, further comprising judging that it is time to finish the first travel, if the number of changes of the direction of the first travel pattern is more than a designated number or if a time of the first travel pattern is more than a designated time.

19. The control method according to claim 18, further comprising moving the robot cleaner in a second travel pattern to finish cleaning.

20. The control method according to claim 19, further comprising judging that it is time to finish the second travel, if a designated time determined in proportion to the mean rectilinear travel distance of the second travel pattern elapses.

21. A robot cleaner to clean an area comprising:

a main body which forms an external appearance of the robot cleaner;

driving wheels installed on the main body; and a control unit to control the driving wheels to enable the main body to move rectilinearly or be rotated, wherein:

the control unit controls the robot cleaner to move in a first travel pattern, the first travel pattern includes:

a first travel path to enable the robot cleaner to proceed from one point in the area toward a designated wall;

a second travel path parallel to the first travel path to enable the robot cleaner to move a distance from the designated wall;

a third travel path enabling the robot cleaner to change a direction after the first travel path or the second travel path and then to travel until the robot cleaner is separated from the first travel path or the second travel path by designated intervals, wherein a route of the first travel path and a route of the second travel path respectively maintain designated intervals, the control unit controls the robot cleaner to move alongside of an obstacle in an obstacle contour following path, if the robot cleaner encounters the obstacle while moving the robot cleaner in one of the first travel path and the second travel path, to obtain a separation distance of the robot cleaner in the obstacle contour following path in a perpendicular direction from one of the first travel path and the second travel path, to move the robot cleaner in the other of the first travel path and the second travel path, if the separation distance reaches the designated intervals, and to move the robot cleaner in the one of the first travel path and the second travel path, if the separation distance reaches zero.

22. The robot cleaner according to claim 21, wherein the control unit instructs the robot cleaner to perform a second travel pattern to finish cleaning the area.

23. At least one non-transitory computer readable medium comprising computer readable instructions that when executed control at least one processor to
- move a robot cleaner in a first travel pattern, the first travel pattern including:
  - a first travel path enabling the robot cleaner to proceed from one point in the area toward a designated wall;
  - a second travel path parallel to the first travel path enabling the robot cleaner to move a distance from the designated wall;
  - a third travel path enabling the robot cleaner to change a direction after the first travel path or the second travel path and then to travel until the robot cleaner is separated from the first travel path or the second travel path by designated intervals,
  - wherein a route of the first travel path and a route of the second travel path respectively maintain the designated intervals;
- move the robot cleaner alongside of an obstacle in an obstacle contour following path, if the robot cleaner encounters the obstacle while moving the robot cleaner in one of the first travel path and the second travel path;
- obtain a separation distance of the robot cleaner in the obstacle contour following path in a perpendicular direction from the one of the first travel path and the second travel path;
- move the robot cleaner in the other of the first travel path and the second travel path, if the separation distance reaches the designated intervals; and
- move the robot cleaner in the one of the first travel path and the second travel path, if the separation distance reaches zero.

* * * * *